(12) United States Patent
Candelore

(10) Patent No.: US 8,667,525 B2
(45) Date of Patent: *Mar. 4, 2014

(54) TARGETED ADVERTISEMENT SELECTION FROM A DIGITAL STREAM

(75) Inventor: Brant L. Candelore, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 742 days.

This patent is subject to a terminal disclaimer.

(21) Appl. No.: 11/371,568

(22) Filed: Mar. 9, 2006

(65) Prior Publication Data

US 2006/0168616 A1  Jul. 27, 2006

Related U.S. Application Data

(63) Continuation-in-part of application No. 10/319,066, filed on Dec. 13, 2002.

(51) Int. Cl.
H04N 7/10 (2006.01)

(52) U.S. Cl.
USPC .................................. 725/32; 725/34; 725/35

(58) Field of Classification Search
None
See application file for complete search history.

(56) References Cited

U.S. PATENT DOCUMENTS

| 3,852,519 | A | 12/1974 | Court ............................. 178/5.1 |
| 4,381,519 | A | 4/1983 | Wilkinson et al. |
| 4,419,693 | A | 12/1983 | Wilkinson |
| 4,521,853 | A | 6/1985 | Guttag |
| 4,634,808 | A | 1/1987 | Moerder |
| 4,700,387 | A | 10/1987 | Hirata |
| 4,703,351 | A | 10/1987 | Kondo |
| 4,703,352 | A | 10/1987 | Kondo |
| 4,710,811 | A | 12/1987 | Kondo |
| 4,712,238 | A | 12/1987 | Gilhousen et al. |
| 4,722,003 | A | 1/1988 | Kondo |
| 4,739,510 | A | 4/1988 | Jeffers et al. .................... 380/15 |
| 4,772,947 | A | 9/1988 | Kono |
| 4,785,361 | A | 11/1988 | Brotby |
| 4,788,589 | A | 11/1988 | Kondo |
| 4,802,215 | A | 1/1989 | Mason ............................ 380/21 |
| 4,803,725 | A | 2/1989 | Horne et al. ................... 380/44 |
| 4,815,078 | A | 3/1989 | Shimura |

(Continued)

FOREIGN PATENT DOCUMENTS

| CA | 2389247 | 5/2001 |
| CA | 2328645 | 7/2001 |

(Continued)

OTHER PUBLICATIONS

U.S. Appl. No. 11/371,479 Office Action mailed Dec. 9, 2008.

(Continued)

*Primary Examiner* — Vivek Srivastava
*Assistant Examiner* — Junior Mendoza
(74) *Attorney, Agent, or Firm* — Blakely, Sokoloff, Taylor & Zafman LLP

(57) ABSTRACT

According to one embodiment, a method of targeted advertisement to a user that includes selecting advertisements based upon user preferences is disclosed. In particular, the method relates to receiving incoming content, which includes a primary advertisement and one or more replacement advertisements. If one of the replacement advertisements is determined to be more appropriate for the user than the primary advertisement, based upon user preferences, then the primary advertisement is substituted with the replacement advertisement.

23 Claims, 9 Drawing Sheets

(56) References Cited

U.S. PATENT DOCUMENTS

| | | |
|---|---|---|
| 4,845,560 A | 7/1989 | Kondo et al. |
| 4,887,296 A | 12/1989 | Horne |
| 4,890,161 A | 12/1989 | Kondo |
| 4,924,310 A | 5/1990 | von Brandt |
| 4,944,006 A | 7/1990 | Citta et al. ................... 380/20 |
| 4,953,023 A | 8/1990 | Kondo |
| 4,989,245 A | 1/1991 | Bennett |
| 4,995,080 A | 2/1991 | Bestler et al. ................ 380/21 |
| 5,018,197 A | 5/1991 | Jones et al. .................. 380/20 |
| 5,023,710 A | 6/1991 | Kondo et al. |
| 5,091,936 A | 2/1992 | Katznelson et al. ........... 380/19 |
| 5,122,873 A | 6/1992 | Golin |
| 5,124,117 A | 6/1992 | Tatebayashi et al. |
| 5,138,659 A | 8/1992 | Kelkar et al. |
| 5,142,537 A | 8/1992 | Kutner et al. |
| 5,144,662 A | 9/1992 | Welmer |
| 5,144,664 A | 9/1992 | Esserman et al. |
| 5,151,782 A | 9/1992 | Ferraro |
| 5,159,452 A | 10/1992 | Kinoshita et al. |
| 5,196,931 A | 3/1993 | Kondo |
| 5,208,816 A | 5/1993 | Seshardi et al. |
| 5,237,424 A | 8/1993 | Nishino et al. |
| 5,237,610 A | 8/1993 | Gammie et al. |
| 5,241,381 A | 8/1993 | Kondo |
| 5,247,575 A | 9/1993 | Sprague et al. ................ 380/9 |
| 5,258,835 A | 11/1993 | Kato |
| 5,319,707 A | 6/1994 | Wasilewski et al. |
| 5,325,432 A | 6/1994 | Gardeck et al. ............... 380/21 |
| 5,327,502 A | 7/1994 | Katata et al. |
| 5,341,425 A | 8/1994 | Wasilewski et al. |
| 5,359,694 A | 10/1994 | Concordel |
| 5,379,072 A | 1/1995 | Kondo |
| 5,381,481 A | 1/1995 | Gammie et al. |
| 5,398,078 A | 3/1995 | Masuda et al. |
| 5,400,401 A | 3/1995 | Wasilewski et al. |
| 5,416,651 A | 5/1995 | Uetake et al. |
| 5,416,847 A | 5/1995 | Boze |
| 5,420,866 A | 5/1995 | Wasilewski ................ 370/110.1 |
| 5,428,403 A | 6/1995 | Andrew et al. |
| 5,434,716 A | 7/1995 | Sugiyama et al. |
| 5,438,369 A | 8/1995 | Citta et al. |
| 5,444,491 A | 8/1995 | Lim |
| 5,455,862 A | 10/1995 | Hoskinson |
| 5,469,216 A | 11/1995 | Takahashi et al. |
| 5,471,501 A | 11/1995 | Parr et al. |
| 5,473,692 A | 12/1995 | Davis |
| 5,481,554 A | 1/1996 | Kondo |
| 5,481,627 A | 1/1996 | Kim |
| 5,485,577 A | 1/1996 | Eyer et al. |
| 5,491,748 A | 2/1996 | Auld, Jr. et al. |
| 5,526,427 A | 6/1996 | Thomas et al. |
| 5,528,608 A | 6/1996 | Shimizume |
| 5,535,276 A | 7/1996 | Ganesan ....................... 380/25 |
| 5,539,823 A | 7/1996 | Martin .......................... 380/20 |
| 5,539,828 A | 7/1996 | Davis |
| 5,555,305 A | 9/1996 | Robinson et al. .............. 380/14 |
| 5,561,713 A | 10/1996 | Suh ................................ 380/10 |
| 5,568,552 A | 10/1996 | Davis |
| 5,574,787 A | 11/1996 | Ryan |
| 5,582,470 A | 12/1996 | Yu |
| 5,583,576 A | 12/1996 | Perlman et al. |
| 5,583,863 A | 12/1996 | Darr, Jr. et al. |
| 5,590,202 A | 12/1996 | Bestler et al. |
| 5,594,507 A | 1/1997 | Hoarty |
| 5,598,214 A | 1/1997 | Kondo et al. |
| 5,600,721 A | 2/1997 | Kitazato |
| 5,606,359 A | 2/1997 | Youden et al. ................. 387/7 |
| 5,608,448 A | 3/1997 | Smoral et al. ................. 348/7 |
| 5,615,265 A | 3/1997 | Coutrot |
| 5,617,333 A | 4/1997 | Oyamada et al. |
| 5,625,715 A | 4/1997 | Trew et al. |
| 5,629,981 A | 5/1997 | Nerlikar |
| 5,652,795 A | 7/1997 | Dillon et al. |
| 5,663,764 A | 9/1997 | Kondo et al. |
| 5,666,293 A | 9/1997 | Metz et al. |
| 5,699,429 A | 12/1997 | Tamer et al. |
| 5,703,889 A | 12/1997 | Shimoda et al. |
| 5,717,814 A | 2/1998 | Abecassis ....................... 386/46 |
| 5,732,346 A | 3/1998 | Lazaridis et al. |
| 5,742,680 A | 4/1998 | Wilson ............................ 380/16 |
| 5,742,681 A | 4/1998 | Giachetti et al. ............... 380/20 |
| 5,751,280 A | 5/1998 | Abbott et al. .................. 345/302 |
| 5,751,743 A | 5/1998 | Takizawa |
| 5,751,813 A | 5/1998 | Dorenbos ....................... 380/49 |
| 5,754,650 A | 5/1998 | Katznelson ..................... 380/15 |
| 5,757,417 A | 5/1998 | Aras et al. ....................... 348/10 |
| 5,757,909 A | 5/1998 | Park |
| 5,768,539 A | 6/1998 | Metz et al. |
| 5,784,464 A | 7/1998 | Akiyama et al. |
| 5,787,171 A | 7/1998 | Kubota et al. |
| 5,787,179 A | 7/1998 | Ogawa et al. |
| 5,796,786 A | 8/1998 | Lee |
| 5,796,829 A | 8/1998 | Newby et al. |
| 5,796,840 A | 8/1998 | Davis |
| 5,802,176 A | 9/1998 | Audebert |
| 5,805,700 A | 9/1998 | Nardone et al. ................ 380/10 |
| 5,805,712 A | 9/1998 | Davis |
| 5,805,762 A | 9/1998 | Boyce et al. |
| 5,809,147 A | 9/1998 | De Lange et al. .............. 380/28 |
| 5,815,146 A | 9/1998 | Youden et al. ................. 345/327 |
| 5,818,934 A | 10/1998 | Cuccia |
| 5,825,879 A | 10/1998 | Davis |
| 5,850,218 A | 12/1998 | LaJoie et al. |
| 5,852,290 A | 12/1998 | Chaney |
| 5,852,470 A | 12/1998 | Kondo et al. |
| 5,870,474 A | 2/1999 | Wasilewski et al. |
| 5,894,320 A | 4/1999 | Vancelette ........................ 348/7 |
| 5,894,516 A | 4/1999 | Brandenburg .................. 380/4 |
| 5,897,218 A | 4/1999 | Nishimura et al. ............. 386/94 |
| 5,915,018 A | 6/1999 | Aucsmith ......................... 380/4 |
| 5,917,830 A * | 6/1999 | Chen et al. ..................... 370/487 |
| 5,917,915 A | 6/1999 | Hirose |
| 5,922,048 A | 7/1999 | Emura ........................... 709/219 |
| 5,923,486 A | 7/1999 | Sugiyama et al. |
| 5,923,755 A | 7/1999 | Birch |
| 5,930,361 A | 7/1999 | Hayashi et al. |
| 5,933,500 A | 8/1999 | Blatter et al. |
| 5,940,738 A | 8/1999 | Rao |
| 5,949,877 A | 9/1999 | Traw et al. |
| 5,949,881 A | 9/1999 | Davis |
| 5,973,679 A | 10/1999 | Abbott et al. .................. 345/302 |
| 5,973,722 A | 10/1999 | Wakai et al. |
| 5,999,622 A | 12/1999 | Yasukawa et al. .............. 380/4 |
| 5,999,698 A | 12/1999 | Nakai et al. .................... 386/125 |
| 6,002,393 A * | 12/1999 | Hite et al. ...................... 715/719 |
| 6,005,561 A | 12/1999 | Hawkins et al. ............... 345/327 |
| 6,011,849 A | 1/2000 | Orrin ............................... 380/42 |
| 6,012,144 A | 1/2000 | Pickett ........................... 713/201 |
| 6,021,199 A | 2/2000 | Ishibashi ........................ 380/10 |
| 6,021,201 A | 2/2000 | Bakhle et al. |
| 6,026,164 A | 2/2000 | Sakamoto et al. |
| 6,028,932 A | 2/2000 | Park |
| 6,029,045 A | 2/2000 | Picco et al. |
| 6,049,613 A | 4/2000 | Jakobsson ....................... 380/47 |
| 6,055,314 A | 4/2000 | Spies et al. |
| 6,055,315 A | 4/2000 | Doyle et al. |
| 6,057,872 A | 5/2000 | Candelore ........................ 348/3 |
| 6,058,186 A | 5/2000 | Enari ............................. 380/10 |
| 6,058,192 A | 5/2000 | Guralnick et al. |
| 6,061,451 A | 5/2000 | Muratani et al. |
| 6,064,748 A | 5/2000 | Hogan ........................... 382/100 |
| 6,065,050 A | 5/2000 | DeMoney ....................... 709/219 |
| 6,069,647 A | 5/2000 | Sullivan et al. |
| 6,072,872 A | 6/2000 | Chang et al. |
| 6,072,873 A | 6/2000 | Bewick .......................... 380/217 |
| 6,073,122 A | 6/2000 | Wool |
| 6,088,450 A | 7/2000 | Davis et al. |
| 6,105,134 A | 8/2000 | Pinder et al. |
| 6,108,422 A | 8/2000 | Newby et al. |
| 6,115,821 A | 9/2000 | Newby et al. |
| 6,118,873 A | 9/2000 | Lotspiech et al. |
| 6,134,551 A | 10/2000 | Aucsmith |
| 6,138,237 A | 10/2000 | Ruben et al. |
| 6,154,206 A | 11/2000 | Ludtke |

(56) References Cited

U.S. PATENT DOCUMENTS

| | | | |
|---|---|---|---|
| 6,157,719 A | 12/2000 | Wasilewski et al. | |
| 6,181,334 B1 | 1/2001 | Freeman et al. | |
| 6,185,369 B1 | 2/2001 | Ko et al. | 386/125 |
| 6,185,546 B1 | 2/2001 | Davis | |
| 6,189,096 B1 | 2/2001 | Haverty | |
| 6,192,131 B1 | 2/2001 | Geer, Jr. et al. | |
| 6,199,053 B1 | 3/2001 | Herbert et al. | |
| 6,204,843 B1 | 3/2001 | Freeman et al. | 345/327 |
| 6,209,098 B1 | 3/2001 | Davis | |
| 6,215,484 B1 | 4/2001 | Freeman et al. | 345/327 |
| 6,226,618 B1 | 5/2001 | Downs et al. | |
| 6,229,895 B1 | 5/2001 | Son et al. | 380/200 |
| 6,230,194 B1 | 5/2001 | Frailong et al. | |
| 6,230,266 B1 | 5/2001 | Perlman et al. | |
| 6,233,577 B1 | 5/2001 | Ramasubramani et al. | |
| 6,236,727 B1 | 5/2001 | Ciacelli et al. | |
| 6,240,553 B1 | 5/2001 | Son et al. | 725/95 |
| 6,246,720 B1 | 6/2001 | Kutner et al. | |
| 6,247,127 B1 | 6/2001 | Vandergeest | 713/100 |
| 6,256,747 B1 | 7/2001 | Inohara et al. | |
| 6,263,506 B1 | 7/2001 | Ezaki et al. | |
| 6,266,416 B1 | 7/2001 | Sigbjornsen et al. | |
| 6,266,480 B1 | 7/2001 | Ezaki et al. | |
| 6,272,538 B1 | 8/2001 | Holden et al. | |
| 6,278,783 B1 | 8/2001 | Kocher et al. | |
| 6,289,455 B1 | 9/2001 | Kocher et al. | |
| 6,292,568 B1 | 9/2001 | Akins et al. | 380/239 |
| 6,292,892 B1 | 9/2001 | Davis | |
| 6,307,939 B1 | 10/2001 | Vigarie | 380/210 |
| 6,311,012 B1 | 10/2001 | Cho et al. | 386/98 |
| 6,314,569 B1 | 11/2001 | Chernock et al. | |
| 6,324,288 B1 | 11/2001 | Hoffman | |
| 6,330,672 B1 | 12/2001 | Shur | 713/176 |
| 6,351,538 B1 | 2/2002 | Uz | |
| 6,377,589 B1 | 4/2002 | Knight et al. | |
| 6,378,130 B1 | 4/2002 | Adams | |
| 6,389,533 B1 | 5/2002 | Davis et al. | |
| 6,389,537 B1 | 5/2002 | Davis et al. | |
| 6,415,031 B1 | 7/2002 | Colligan et al. | 380/200 |
| 6,415,101 B1 | 7/2002 | deCarmo et al. | 386/105 |
| 6,424,717 B1 | 7/2002 | Pinder et al. | |
| 6,430,361 B2 | 8/2002 | Lee | 386/98 |
| 6,442,689 B1 | 8/2002 | Kocher | |
| 6,445,738 B1 | 9/2002 | Zdepski et al. | |
| 6,449,718 B1 | 9/2002 | Rucklidge et al. | 713/168 |
| 6,453,115 B1 | 9/2002 | Boyle | |
| 6,456,985 B1 | 9/2002 | Ohtsuka | |
| 6,459,427 B1 | 10/2002 | Mao et al. | 345/327 |
| 6,463,152 B1 | 10/2002 | Takahashi | 380/201 |
| 6,466,671 B1 | 10/2002 | Maillard et al. | |
| 6,477,649 B2 | 11/2002 | Kambayashi et al. | |
| 6,505,032 B1 | 1/2003 | McCorkle et al. | 455/41 |
| 6,510,554 B1 | 1/2003 | Gordon et al. | 725/90 |
| 6,519,693 B1 | 2/2003 | Debey | |
| 6,529,526 B1 | 3/2003 | Schneidewend | |
| 6,543,053 B1 | 4/2003 | Li et al. | 725/88 |
| 6,549,229 B1 | 4/2003 | Kirby et al. | |
| 6,550,008 B1 | 4/2003 | Zhang et al. | |
| 6,557,031 B1 | 4/2003 | Mimura et al. | |
| 6,587,561 B1 | 7/2003 | Sered et al. | 380/241 |
| 6,590,979 B1 | 7/2003 | Ryan | |
| 6,609,039 B1 | 8/2003 | Schoen | 700/94 |
| 6,640,145 B2 | 10/2003 | Hoffberg et al. | 700/83 |
| 6,640,305 B2 | 10/2003 | Kocher et al. | |
| 6,643,298 B1 | 11/2003 | Brunheroto et al. | |
| 6,650,754 B2 | 11/2003 | Akiyama et al. | |
| 6,654,389 B1 | 11/2003 | Brunheroto et al. | |
| 6,678,740 B1 | 1/2004 | Rakib et al. | 9/247 |
| 6,681,326 B2 | 1/2004 | Son et al. | 713/150 |
| 6,697,489 B1 | 2/2004 | Candelore | |
| 6,697,944 B1 | 2/2004 | Jones et al. | |
| 6,698,020 B1 * | 2/2004 | Zigmond et al. | 725/34 |
| 6,707,696 B1 | 3/2004 | Turner et al. | |
| 6,718,551 B1 * | 4/2004 | Swix et al. | 725/32 |
| 6,732,367 B1 | 5/2004 | Ellis et al. | |
| 6,754,276 B1 | 6/2004 | Harumoto et al. | |
| 6,772,340 B1 | 8/2004 | Peinado et al. | |
| 6,788,690 B2 | 9/2004 | Harri | |
| 6,816,703 B1 | 11/2004 | Wood et al. | |
| 6,826,185 B1 | 11/2004 | Montanaro et al. | |
| 6,904,520 B1 | 6/2005 | Rosset et al. | |
| 6,976,166 B2 | 12/2005 | Herley et al. | |
| 7,010,685 B1 | 3/2006 | Candelore | |
| 7,039,938 B2 | 5/2006 | Candelore | |
| 7,058,806 B2 | 6/2006 | Smeets et al. | |
| 7,120,250 B2 | 10/2006 | Candelore | |
| 7,124,303 B2 | 10/2006 | Candelore et al. | |
| 7,124,938 B1 | 10/2006 | Marsh | |
| 7,139,398 B2 | 11/2006 | Candelore et al. | |
| 7,146,007 B1 | 12/2006 | Maruo et al. | |
| 7,146,627 B1 * | 12/2006 | Ismail et al. | 725/47 |
| 7,151,831 B2 | 12/2006 | Candelore et al. | |
| 7,155,012 B2 | 12/2006 | Candelore et al. | |
| 7,242,766 B1 | 7/2007 | Lyle | |
| 7,254,234 B2 | 8/2007 | Sugahara et al. | |
| 7,500,258 B1 * | 3/2009 | Eldering | 725/32 |
| 8,051,443 B2 * | 11/2011 | Candelore et al. | 725/32 |
| 2001/0030959 A1 | 10/2001 | Ozawa et al. | |
| 2001/0042043 A1 | 11/2001 | Shear et al. | |
| 2002/0013943 A1 * | 1/2002 | Haberman et al. | 725/39 |
| 2002/0021805 A1 | 2/2002 | Schumann et al. | |
| 2002/0026587 A1 | 2/2002 | Talstra et al. | |
| 2002/0044658 A1 | 4/2002 | Wasilewski et al. | |
| 2002/0046406 A1 | 4/2002 | Chelehmal et al. | 725/87 |
| 2002/0047915 A1 | 4/2002 | Misu | |
| 2002/0056093 A1 * | 5/2002 | Kunkel et al. | 725/35 |
| 2002/0059425 A1 | 5/2002 | Belfiore et al. | 709/226 |
| 2002/0083438 A1 | 6/2002 | So et al. | |
| 2002/0083439 A1 | 6/2002 | Eldering | |
| 2002/0090090 A1 | 7/2002 | Van Rijnsoever et al. | |
| 2002/0094084 A1 | 7/2002 | Wasilewski et al. | |
| 2002/0097322 A1 | 7/2002 | Monroe et al. | |
| 2002/0108035 A1 | 8/2002 | Herley et al. | 713/165 |
| 2002/0109707 A1 | 8/2002 | Lao et al. | |
| 2002/0129243 A1 | 9/2002 | Nanjundiah | 713/160 |
| 2002/0144262 A1 * | 10/2002 | Plotnick et al. | 725/32 |
| 2002/0150239 A1 | 10/2002 | Carny et al. | |
| 2002/0170053 A1 | 11/2002 | Peterka et al. | |
| 2002/0184506 A1 | 12/2002 | Perlman | |
| 2002/0188567 A1 | 12/2002 | Candelore | |
| 2002/0194613 A1 | 12/2002 | Unger | 725/118 |
| 2002/0196939 A1 | 12/2002 | Unger et al. | 380/216 |
| 2003/0009669 A1 | 1/2003 | White et al. | |
| 2003/0021412 A1 | 1/2003 | Candelore et al. | 380/217 |
| 2003/0025423 A1 | 2/2003 | Miller et al. | |
| 2003/0026423 A1 | 2/2003 | Unger et al. | |
| 2003/0026523 A1 | 2/2003 | Chua et al. | |
| 2003/0035540 A1 | 2/2003 | Freeman et al. | |
| 2003/0035543 A1 | 2/2003 | Gillon et al. | |
| 2003/0046686 A1 | 3/2003 | Candelore et al. | |
| 2003/0063615 A1 | 4/2003 | Luoma et al. | 370/401 |
| 2003/0072555 A1 | 4/2003 | Yap et al. | |
| 2003/0081630 A1 | 5/2003 | Mowery et al. | |
| 2003/0081776 A1 | 5/2003 | Candelore | 380/200 |
| 2003/0084284 A1 | 5/2003 | Ando et al. | |
| 2003/0084457 A1 | 5/2003 | Lee et al. | |
| 2003/0097662 A1 | 5/2003 | Russ et al. | |
| 2003/0104717 A1 | 6/2003 | Hayakawa | |
| 2003/0108199 A1 | 6/2003 | Pinder et al. | |
| 2003/0115595 A1 * | 6/2003 | Stevens et al. | 725/32 |
| 2003/0123664 A1 | 7/2003 | Pedlow, Jr. et al. | 380/218 |
| 2003/0123849 A1 | 7/2003 | Nallur et al. | 386/68 |
| 2003/0133570 A1 | 7/2003 | Candelore et al. | 380/210 |
| 2003/0145329 A1 | 7/2003 | Candelore | 725/87 |
| 2003/0149975 A1 * | 8/2003 | Eldering et al. | 725/34 |
| 2003/0152224 A1 | 8/2003 | Candelore et al. | 380/210 |
| 2003/0152226 A1 | 8/2003 | Candelore et al. | 380/218 |
| 2003/0156718 A1 | 8/2003 | Candelore et al. | 380/211 |
| 2003/0157140 A1 | 8/2003 | Takada | |
| 2003/0159139 A1 | 8/2003 | Candelore et al. | 725/25 |
| 2003/0159140 A1 | 8/2003 | Candelore | 725/31 |
| 2003/0159152 A1 | 8/2003 | Lin et al. | 725/87 |
| 2003/0172381 A1 | 9/2003 | Janevski | |
| 2003/0174837 A1 | 9/2003 | Candelore et al. | 380/210 |

(56) References Cited

U.S. PATENT DOCUMENTS

| | | | |
|---|---|---|---|
| 2003/0174844 A1 | 9/2003 | Candelore | |
| 2003/0188164 A1 | 10/2003 | Okimoto et al. | |
| 2003/0190054 A1 | 10/2003 | Troyansky et al. | |
| 2003/0198223 A1 | 10/2003 | Mack et al. | 370/392 |
| 2003/0204717 A1 | 10/2003 | Kuehnel | |
| 2003/0222994 A1 | 12/2003 | Dawson | |
| 2003/0226149 A1 | 12/2003 | Chun et al. | 725/78 |
| 2004/0003008 A1 | 1/2004 | Wasilewski et al. | 707/200 |
| 2004/0037421 A1 | 2/2004 | Truman | |
| 2004/0047470 A1 | 3/2004 | Candelore | 380/240 |
| 2004/0049688 A1 | 3/2004 | Candelore et al. | 713/191 |
| 2004/0049690 A1 | 3/2004 | Candelore et al. | 713/193 |
| 2004/0049691 A1 | 3/2004 | Candelore et al. | 713/193 |
| 2004/0049694 A1 | 3/2004 | Candelore | 713/200 |
| 2004/0064688 A1 | 4/2004 | Jacobs | |
| 2004/0073917 A1 | 4/2004 | Pedlow, Jr. et al. | |
| 2004/0078575 A1 | 4/2004 | Morten et al. | 713/176 |
| 2004/0086127 A1 | 5/2004 | Candelore | |
| 2004/0088541 A1 | 5/2004 | Messerges | |
| 2004/0088552 A1 | 5/2004 | Candelore | |
| 2004/0123094 A1 | 6/2004 | Sprunk | |
| 2004/0139337 A1 | 7/2004 | Pinder et al. | |
| 2004/0141314 A1 | 7/2004 | Vautrin et al. | |
| 2004/0158721 A1 | 8/2004 | Candelore | |
| 2004/0165586 A1 | 8/2004 | Read et al. | 370/389 |
| 2004/0181666 A1 | 9/2004 | Candelore | |
| 2004/0187161 A1 | 9/2004 | Cao | 725/110 |
| 2005/0004875 A1 | 1/2005 | Kontio et al. | |
| 2005/0028193 A1 | 2/2005 | Candelore et al. | |
| 2005/0036067 A1 | 2/2005 | Ryal et al. | |
| 2005/0063541 A1 | 3/2005 | Candelore | |
| 2005/0094808 A1 | 5/2005 | Pedlow, Jr. et al. | |
| 2005/0094809 A1 | 5/2005 | Pedlow, Jr. et al. | |
| 2005/0097596 A1 | 5/2005 | Pedlow, Jr. | |
| 2005/0097597 A1 | 5/2005 | Pedlow, Jr. et al. | |
| 2005/0097598 A1 | 5/2005 | Pedlow et al. | |
| 2005/0097614 A1 | 5/2005 | Pedlow, Jr. et al. | |
| 2005/0102702 A1 | 5/2005 | Candelore et al. | |
| 2005/0129233 A1 | 6/2005 | Pedlow et al. | |
| 2005/0141713 A1 | 6/2005 | Genevois | |
| 2005/0169473 A1 | 8/2005 | Candelore | |
| 2005/0192904 A1 | 9/2005 | Candelore | |
| 2006/0026926 A1 | 2/2006 | Triel et al. | |
| 2006/0029060 A1 | 2/2006 | Pister | |
| 2006/0112344 A1 | 5/2006 | Ducheneaut et al. | |
| 2006/0115083 A1 | 6/2006 | Candelore et al. | |
| 2006/0130119 A1 | 6/2006 | Candelore et al. | |
| 2006/0130121 A1 | 6/2006 | Candelore et al. | |
| 2006/0136976 A1* | 6/2006 | Coupe et al. | 725/131 |
| 2006/0143655 A1* | 6/2006 | Ellis et al. | 725/47 |
| 2006/0153379 A1 | 7/2006 | Candelore et al. | |
| 2006/0168616 A1 | 7/2006 | Candelore | |
| 2006/0174264 A1 | 8/2006 | Candelore | |
| 2007/0028264 A1 | 2/2007 | Lowe | |
| 2008/0127251 A1* | 5/2008 | Wachtfogel et al. | 725/34 |

FOREIGN PATENT DOCUMENTS

| | | |
|---|---|---|
| EA | 0 674 440 | 9/1995 |
| EP | 0471373 | 2/1992 |
| EP | 0527611 | 7/1992 |
| EP | 0558016 | 2/1993 |
| EP | 0596826 | 4/1993 |
| EP | 0610587 | 12/1993 |
| EP | 0680209 | 4/1995 |
| EP | 0 674 441 | 9/1995 |
| EP | 0720374 | 7/1996 |
| EP | 0833517 | 4/1998 |
| EP | 0866615 | 9/1998 |
| EP | 1187483 | 3/2002 |
| JP | 07-046575 | 2/1995 |
| JP | 7067028 | 3/1995 |
| JP | 11159162 | 6/1999 |
| JP | 11243534 | 10/2002 |
| JP | 2003330897 | 11/2003 |
| WO | WO8607224 | 12/1986 |
| WO | WO-8902682 | 3/1989 |
| WO | WO-93/09525 | 5/1993 |
| WO | WO-94/10775 | 5/1994 |
| WO | WO9738530 | 10/1997 |
| WO | WO00/31964 | 6/2000 |
| WO | WO0051039 | 8/2000 |
| WO | WO-00/59203 | 10/2000 |
| WO | WO 01 11819 | 2/2001 |
| WO | WO-01/26372 | 4/2001 |
| WO | WO 01/65762 A2 | 9/2001 |
| WO | WO01/78386 | 10/2001 |
| WO | WO-2004042516 | 5/2004 |

OTHER PUBLICATIONS

U.S. Appl. No. 10/691,170 Notice of Allowance mailed Nov. 10, 2008.

U.S. Appl. No. 11/227,584, filed Sep. 15, 2005; Titled: Advanced Parental Control for Digital Content; Inventor: Brant L. Candelore.

U.S. Appl. No. 11/371,479, filed Mar. 9, 2006; Titled: Content Personalization for Digital Content; Inventor Brant L. Candelore.

"Ad Agencies and Advertisers to be Empowered with Targeted Ad Delivered by Television's Prevailing Video Servers", *Article Business Section of The New York Times*, (Dec. 20, 2001).

"CLearPlay: The Technology of Choice", from web site, http://www.clearplay.com/what.asp, *ClearPlay 2001-2003*.

"McCormac Hack Over Cablemodem", *HackWatch*, http://www.hackwatch.com/cablemodbook.html, (Aug. 10, 1998).

"Message Authentication with Partial Encryption", *Research disclosure RD 296086*, (Dec. 10, 1988).

"Metro Media PVR-DVD-MP3-Web", *Internet publication from www.metrolink.com*, (undated).

"New Digital Copy protection Proposal Would Secure Authorized Copies", *PR Newswire*, (Nov. 13, 1998),1-3.

"Passage Freedom to Choose", *Sony Electronics Inc.*, (2003).

"Pre-Encryption Profiles—Concept Overview and Proposal", *Rev. 1.2 as submitted to the Open CAS consortium on Dec. 28, 2000*.

Agi, Iskender, et al., "An Empirical Study of Secure MPEG Video Transmissions", *IEEE, Proceedings of SNDSS 96*, (1996),137-144.

Alattar, Adnan, et al., "Evaluation of Selective Encryption Techniques for Secure Transmission of MPEG-Compressed Bit-Streams", *IEEE*, (1999),IV-340 to IV-343.

Alattar, Adnan M., et al., "Improved Selective Encryption Techniques for Secure Transmission of MPEG Video Bit-Streams", *IEEE*, (1999),256-260.

Aravind, H., et al., "Image and Video Coding Journal Standards", *AT&T Technical Journal*, (Jan./Feb. 1993),67-68.

Benini, Luca, et al., "Energy-Efficient Data Acrambling on Memory-Processor Interfaces", *ISLPED '03*, Aug. 25-27, 2003, Seoul, Korea, (2003),26-29.

Brown, Jessica, "The Interactive Commercial, Coming Soon to a TV Near You".

Dittmann, Jana, et al., "Multimedia and Security Workshop at ACM Multimedia", Bristol, U.K., (Sep. 1998).

Dondeti, Lakshminath R., et al., "A Dual Encryption Protocol for Scalable Secure Multicasting", *1999 International Symposium on Computers and Communication*, Jul. 6-8, 1999.

Gonzalez, R. C., et al., "Digital Image Processing", *Addison Wesley Publishing Company, Inc.*, (1992), 346-348.

Gulwani, Sumit, "A Report on Security Issues in Multimedia", *Department of Computer Science and Engineering, Indian Institute of Technology Kanpur*, Course Notes,(Apr. 30, 2000), pp. 10-14.

Haberman, Seth, "Visible World—A High Impact Approach to Customized Television Advertising", (Dec. 2001).

Kim, et al., "Bit Rate Reduction Algorithm for a Digital VCR", *IEEE Transactions on Consumer Electronics*, vol. 37, No. 3, (Aug. 1, 1992),267-274.

Koenen, Rob H., et al., "The Long March to Interoperable Digital Rights Management", *IEEE*, (2004),1-17.

Kondo, et al., "A New Concealment Method for Digital VCRs", *IEEE Visual Signal Processing and Communication*, Australia,(Sep. 1993),20-22.

(56) References Cited

OTHER PUBLICATIONS

Kondo, et al., "Adaptive Dynamic Range Coding Scheme for Future Consumer Digital VTR", 219-226.
Kondo, et al., "Adaptive Dynamic Range Coding Scheme for Future HDTV Digital VTR", *Sony Corporation*, (1991).
Kunkelmann, Thomas , "Applying Encryption to Video Communication", *Multimedia and Security Workshop at ACM Multimedia ?98*. Bristol, U.K., (Sep. 1998),41-47.
Liu, Zheng , et al., "Motion Vector Encryption in Multimedia Streaming", *Proccedings of the 10th International Multimedia Modeling Conference 2004 IEEE*, (2004), 1-8.
Lookabaugh, Tom , et al., "Selective Encryption and MPEG-2", *ACM Multimedia '03*, (Nov. 2003).
Menezes, Alfred J., et al., "Handbook of Applied Cryptography", *CRC Press*, 551-553.
Naor, Moni , et al., "Certificate Revocation and Certificate update", Apr. 2000, *IEEE Journal on Selected Areas in Communications, IEEE*, vol. 18, No. 4, (2000),561-570.
NCUBE, "Digital Program Insertion", (May 2001).
NCUBE, "Smooth Ad Insertion Deployment Protects Revenues", (2004).
NHK Laboratories Note, "Error Correction, Concealment and Shuffling", No. 424, (Mar. 1994),29-44.
OPENTV, "OPENTV to Showcase Several Advanced Interactive Television Solutions at IBC 2004", (Sep. 6, 2004).
Park, et al., "A Simple Concealment for ATM Bursty Cell Loss", *IEEE Transaction on Consumer Electronics*, No. 3, (Aug. 1993),704-709.
Park, Joon S., et al., "Binding Identities and Attributes Using Digitally Singed Certificates", *IEEE*, (2000).
Pazarci, Melih , et al., "Data Embedding in Scrambled Digital Video", *Computers and Communication Proceedings, Eighth IEEE International Symposium on 2003, vol. 1 (ISCC 2003*, (2003),498-503.
Piazza, Peter , "E-Signed, Sealed, and Delivered", *Security Management*, vol. 45, No. 4, (Apr. 2001),72-77.
Qiao, Lintian , et al., "Comparison of MPEG Encryption Algorithms", *Department of Computer Science, University of Illinois at Urbana-Champaign*, (Jan. 17, 1998),1-20.
Robert, Arnaud , et al., "Digital Cable: the Key to Your Content", *Access Intelligence's Cable Group*, online at http:www.cableworld.com/ct/archives/0202/0202digitalrights.htm, (Feb. 2002).
Rosenblatt, Bill , "Coral Consortium Aims to Make DRM Interoperable", online at http://www.drmwatch.com/standards/article.pho/3418741, (Oct. 4, 2004).
Seachange International, "Dynamic-Customized TV Advertising Creation and Production Tools", *Web Site Literature*.
Seachange International, "Transport Streams Insertion of Video in the Compressed Digital Domain", *Web Site Literature*, (2000).
Shi, Changgui , et al., "An Efficient MPEG Video Algorithm", *1998 IEEE, Department of Computer Sciences, Purdue University*, West Lafayette, IN, 381-386.
Spanos, George A., et al., "Performance Study of a Selective Encryption Scheme for the Security of Networked, Real-Time Video", *IEEE*, (1995),2-10.
Taylor, Jim , "DVD Demystified—The Guidebook for DVD-Video and DVD-ROM", *Pub. McGraw-Hill ISBN: 0-07-064841-7, pp. 134-147*, 1998 ,134-147.
Thawani, Amit , et al., "Context Aware Personalized Ad Insertion in an Interactive TV Environment".
Tom, et al., "Packet Video for Cell Loss Protection Using Deinterleaving and Scrambling", *ICASSP 91: 1991 International Conference on Acoustics, Speech and Signal Processing, vol. 4*, (Apr. 1991),2857-2860.
Wu, Chung-Ping , et al., "Fast Encryption Methods for Audiovisual Data Confidentiality", *SPIE International Symposia on Information Technologies* (Boston, Ma., USA), (Nov. 2000),284-295.
Wu, S. Felix , et al., "Run-Time Performance Evaluation for a Secure MPEG and System Supporting Both Selective Watermarking and Encryption", *submitted to JSAC special issue on Copyright and Privacy Protection*, (Mar. 1, 1997).
Wu, Tsung-Li , et al., "Selective Encryption and Watermarking of MPEG Video (Extended Abstract)", *International Conference on Image Science, Systems, and Technology, CISST?97*, (Feb. 17, 1997).
Zeng, Wenjun , et al., "Efficient Frequency Domain Video Scrambling for Content Access Control", *In Proc. ACM Multimedia*, (Nov. 1999).
Zhu, et al., "Coding and Cell-Loss Recovery in DCT-Based Packet Video", *IEEE Transactions on Circuits and Systems for Video Technology, No. 3*, NY,(Jun. 3, 1993).
"How Networks Work, Millennium Edition", *Que Corporation*, (Sep. 2000),88-89.
Shavik, Kirstnamurthy , "Securant Technologies Delivers Broad PKI Integration to Enable Standards Based Security", *Business Wires*, Oct. 4, 1999.
U.S. Appl. No. 10/388,002 Office Action, entitled "Mechanism for protecting the transfer of digital content", 1st named inventor: Brant L. Candelore, mailed May 6, 2008.
U.S. Appl. No. 10/690,192 Office Action mailed Sep. 24, 2008.
U.S. Appl. No. 10/690,192 Office Action mailed Mar. 4, 2009.
U.S. Appl. No. 10/962,830 Office Action mailed Dec. 11, 2007.
U.S. Appl. No. 10/9602,830 Office Action mailed Jun. 26, 2008.
U.S. Appl. No. 10/962,830 Office Action mailed Oct. 28, 2008.
U.S. Appl. No. 10/962,830 Office Action mailed May 5, 2009.
PCT Internal Search Report and Written Opinion, International Application No. PCT/US05/31171, mailed Oct. 26, 2006.
U.S. Appl. No. 10/690,192 Office Action mailed Jun. 30, 2009.
U.S. Appl. No. 11/371,479, Non-Final Office Action mailed Mar. 16, 2010.
U.S. Appl. No. 11/371,479 Final Office Action mailed Sep. 24, 2010.
U.S. Appl. No. 11/371,479 Office Action mailed Jul. 19, 2011.
U.S. Appl. No. 13/079,603 Office Action mailed Jun. 6, 2012.

\* cited by examiner ively implemented as a finite state machine or even combinatorial logic.
TARGETED ADVERTISEMENT SELECTION FROM A DIGITAL STREAM This application is a continuation-in-part of application Ser. No. 10/319,066 filed on Dec. 13, 2002.

BACKGROUND

1. Field

Embodiments of the invention relate to targeted advertisement selection. More specifically, one embodiment of the invention relates to an apparatus and method for selecting targeted advertisements from a digital stream based upon user preferences.

2. General Background

Television is used to deliver content, such as entertainment and educational programs to viewers. Service providers, such as television stations and networks, broadcast entertainment and information programming via a communications medium, such as a television network or cable system, from the head-end of a communications system to a client or user at the receiving end of the system. Traditionally, a large source of revenue for service providers has been from paid advertisements.

The growth of digital television transmitted over satellite, cable, as well as terrestrial networks has increased the amount of different channels available for viewing by users and has driven advertisers to "better target" users by local personalized advertisements, which may generate better leads for future sales. Further, the advent of Personal Video Recorders (PVRs) and Video On Demand (VOD) is a threat to advertisers because it creates ad-skippers. As viewers start evading advertisements, ad agencies must compete on innovative ways to ensure their advertisements are viewed.

There is therefore a need to re-work TV advertising to create innovative techniques that can exploit advertisement opportunities.

Personalization in television advertising has been identified by advertisers as a technique that may be useful in targeting advertising to individual users by focusing on users' likes and dislikes.

Unfortunately, conventional digital video content, such as MPEG video, takes the form of a single program, movie, or other content without the opportunity for a service provider or a user to modify the viewing experience by selecting alternative content, such as, targeted advertisements. Various mechanisms have been proposed for providing interactive or personalized content, but typically such proposals have been expensive to implement, take up large amounts of bandwidth, and may require expensive specialized equipment.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
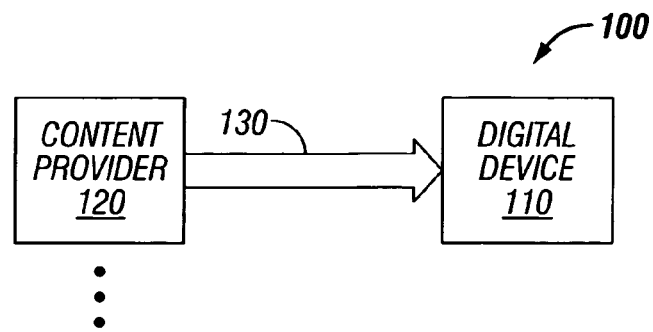
FIG. 1 is an exemplary block diagram of a content delivery system consistent with certain embodiments of the invention.

In the following description, the various embodiments of the invention will be described in detail. However, such details are included to facilitate understanding of the invention and to describe exemplary embodiments for employing the invention. Such details should not be used to limit the invention to the particular embodiments described because other variations and embodiments are possible while staying within the scope of the invention. Furthermore, although numerous details are set forth in order to provide a thorough understanding of the embodiments of the invention, it will be apparent to one skilled in the art that these specific details are not required in order to practice the embodiments of the invention. In other instances details such as, well-known methods, types of data, protocols, procedures, components, electrical structures and circuits, are not described in detail, or are shown in block diagram form, in order not to obscure the invention.

For purposes of the present description, the term "digital device" may refer to a television that is adapted to tune, receive, decrypt, descramble and/or decode transmissions from any content provider. Examples of "content providers" may include a terrestrial broadcaster, a cable or satellite television distribution system, or a company providing content for download over the Internet or other Internet Protocol (IP) based networks like an Internet service provider. However, it is contemplated that the digital device may be of another form factor besides a television, such as a set-top box, a personal digital assistant (PDA), a computer, a cellular telephone, a video game console, a portable music player, a stereo system, a personal video recorder, or the like.

In the following description, certain terminology is used to describe features of the invention. For example, in certain situations, the terms "component," "unit" and "logic" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). of course, the hardware may be alternatively implemented as a finite state machine or even combinatorial logic.

An example of "software" includes executable code in the form of an application, an applet, a routine or even a series of instructions. The software may be stored in any type of machine readable medium such as a programmable electronic circuit, a semiconductor memory device such as volatile memory (e.g., random access memory, etc.) and/or non-volatile memory (e.g., any type of read-only memory "ROM", flash memory, etc.), a floppy diskette, an optical disk (e.g., compact disk or digital video disc "DVD"), a hard drive disk, a tape, or the like.

In addition, the term "program" generally represents a stream of digital content that is configured for transmission to one or more digital devices for viewing and/or listening. According to one embodiment, the program may contain multiple Packet Identifiers (PIDs) when the program is MPEG (Moving Pictures Expert Group) compliant compressed video. These multiple PIDs may provide for replacement of one scene of content for another. The "scene" is defined as one or more frames of content, namely video, images, audio or any combination thereof. For instance, a scene may be one or more frames of video and/or audio, or even a packet of music downloaded into a portable music player.

More specifically, multiple PIDs may be associated with a single program in order to provide content replacement for this program. Content replacement provides an enhanced level of viewing/listening customization. For example, content replacement can be used to provide targeted advertising to a user. Content replacement can also be used to provide multiple scenes, endings or other segments for a program, or perhaps to provide multiple views in a sportscast or other program. Other applications for the content replacement of the invention fall within the spirit and scope of the invention.

Herein advertisements (hereinafter referred to as "ads") may be broadly defined. Particularly, advertisements may include a logo, a banner, or may be a full audio/visual (A/V) commercial. Advertisements may be of many different forms. As an example, a logo such as "Pepsi" or "Coke" may be considered an ad and may be swapped or replaced in a TV series or a commercial by various means, such as, macroblock or slice substitution.

Also, ads may include multiple and different types of ad versions. For example, one ad may be for a national car dealership whereas another version of the same ad may be for a local car dealership. These types of ads may be efficiently inter-utilized by simply replacing national call names for local call names.

Ads may additionally include banner ads that may be presented over currently playing video content, for example, by frame substitution.

Further, ads may also be "full motion" audio/visual ads that include areas that may contain customizable static text areas and that may be susceptible to audio/visual replacement of characters, actors, locations, settings, scenes, objects, etc.

Thus, ads include, but are not limited to the above-described examples, but, as should be appreciated by those skilled in this art, may include any type of ad.

While this invention is susceptible to implementation in embodiments of many different forms, there is shown in the drawings and will herein be described in detail specific embodiments, with the understanding that the present disclosure is to be considered as an example of the principles of the invention and not intended to limit the invention to the specific embodiments shown and described.

In one embodiment, embodiments of the present invention relate to targeted ad swapping for digital content received from a digital broadcast stream for a user.

More particularly, embodiments of the invention may relate to an apparatus and method for receiving incoming content, such as, a digital broadcast stream, including a primary advertisement and one or more replacement advertisements. If a replacement advertisement is determined to be more appropriate than a primary advertisement to a user based upon user preferences than the primary advertisement may be substituted or replaced with the replacement advertisement.

In one embodiment, the content may be delivered in a stream of packets and substituting the primary advertisement with the replacement advertisement includes swapping packets. In one example, the packets may be in a MPEG transport stream of packets and may include Internet Protocol (IP) packets. Thus, the content may be delivered in a stream of IP packets. In this embodiment, substituting the primary advertisement with the replacement advertisement includes selecting fields within the IP packets.

As previously discussed, primary advertisements and/or replacement advertisements may include logos, banners, full audio/visual commercials, and combinations thereof.

In one embodiment, in order to determine if a replacement ad is more appropriate than a primary ad, advertisement descriptor parameters associated with the primary advertisement and the replacement advertisement may be compared with advertisement preference parameters associated with a user. For example, these advertisement preference parameters associated with a user may be determined by the use of a preference engine. It should be appreciated that advertisement preference parameters may include a wide variety of user preference parameters such as location, sex, age, language, sports, interest, etc.

In one particular embodiment, as will be described in more detail later, advertisement preference parameters determined by a preference engine may be utilized to select targeted ads that a user might like to see. Ad substitution or replacement may occur on certain packet identifiers (PIDs). An ad selector of a digital device (e.g. a set-top box) may then be utilized to decide if any advertisement replacements should occur depending on which PID is determined to contain the ad of the greatest interest to the user.

For example, as will be discussed, ad content may be signaled using adaption fields of streaming video content and these adaption fields may be parsed by the decoder. Upon parsing the adaption information, the decoder may provide a signal to the digital device as to whether to utilize the primary ad associated with the digital stream or the replacement ad which should be used in substitution thereof.

It should be appreciated that ads may be substituted on a scene-by-scene basis, e.g. entire frames, and/or by individual slices and macro blocks in any given scene. As will be described, embodiments of the invention utilize real-time packet substitution and packet interleaving such that digital content is self synchronized. Ad content may be individual packets in a frame, individual frames, or entire scenes of content. These techniques provide a practical and relatively low bandwidth method that may be used to employ a customizable text block that may be tailored for a specific region of a scene. As an example, for auto dealership advertisements "Ford", "Toyota" or "Jeep" logos or banners may be utilized. Ads may be utilized in "edit zones" of the screen whereby text and possibly logos of various types may be substituted in a particular area of the screen, dependent upon user preferences.

Referring to FIG. 1, an exemplary block diagram of a content delivery system 100 consistent with certain embodiments of the invention is shown. Content delivery system 100 comprises a digital device 110 that receives digital content such as a program from one or more content providers 120. The program may be propagated as a digital data stream for example in compliance with any data compression scheme. Examples of a data compression scheme include, but are not limited or restricted MPEG standards.

According to one embodiment of the invention, digital device 110 decodes an incoming program, and evaluates the content of the incoming program on a scene-by-scene basis to determine whether targeted Ad substitution should take place. These evaluation schemes are described below.

Content provider 120 provides the digital content to digital device 110 through transmission medium 130, which operates as a communication pathway for the program within content delivery system 100. The transmission medium 130 may include, but is not limited to electrical wires, optical fiber, cable, a wireless link established by wireless signaling circuitry, or the like.

Figure 2:
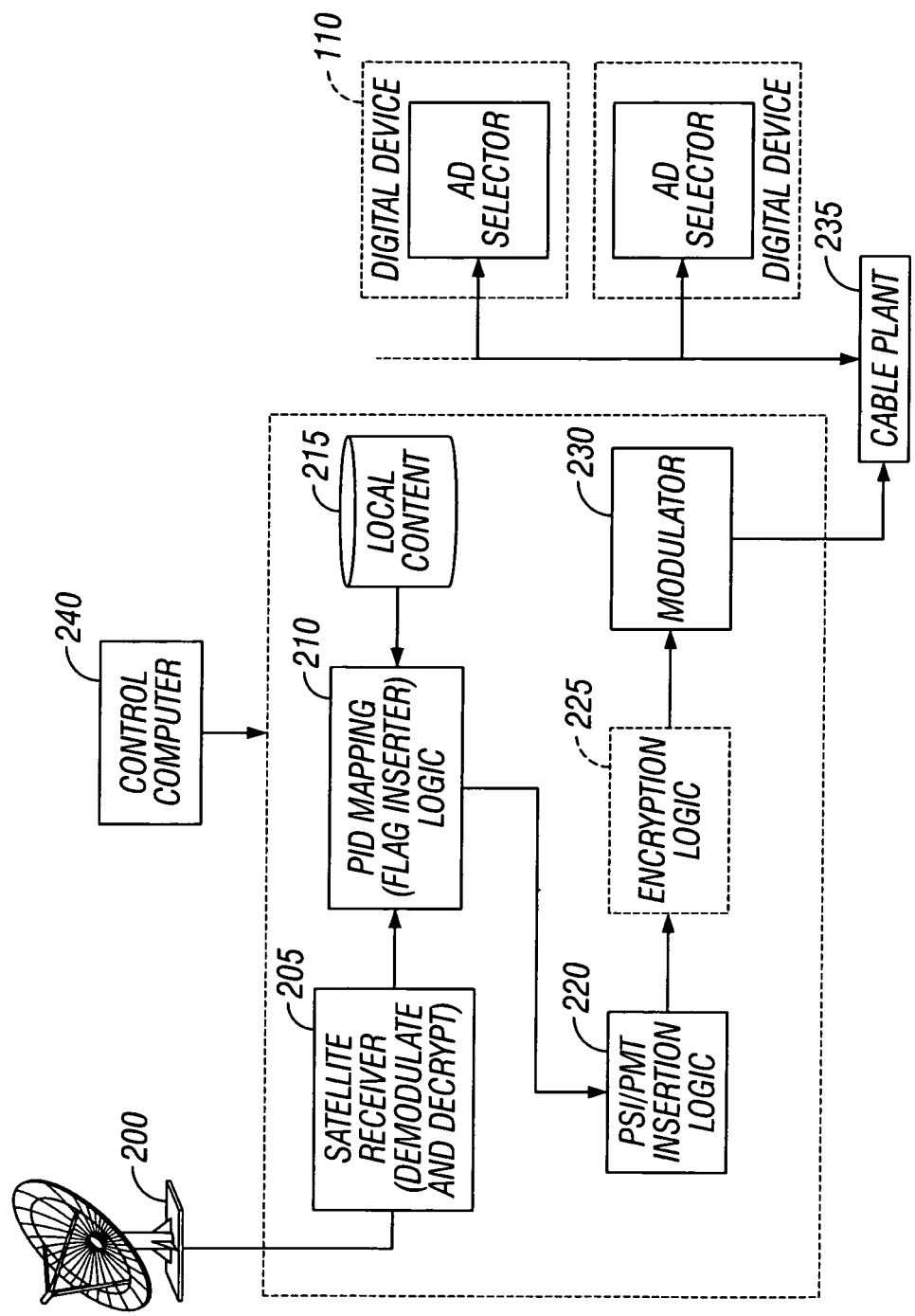
FIG. 2 is an exemplary block diagram of a content provider consistent with certain embodiments of the invention.

Content provider 120 may be adapted with a satellite antenna 200 to receive a multiplexed stream of content from a satellite transmission as shown in FIG. 2. The stream of content is received, demodulated and decrypted at a satellite receiver 205 before being routed to PID Mapping logic 210. The stream of content may include replacement content (such as an advertisements) associated with secondary PIDs. Alternatively, the replacement content (such as an advertisement) may be retrieved from a local content database 215 or other sources of content.

PID mapping logic 210 maps the incoming content from whatever source to a set of primary PIDs and a set of secondary PIDs. The incoming content includes (i) content originally intended for rendering (referred to as the "main content") and (ii) substitution content for various scenes (referred to as "replacement content"). The main content (e.g. a main or primary Ad) is associated with the primary PIDs and the replacement content (e.g. replacement Ads) are associated with the secondary PIDs. According to this embodiment, PID mapping logic 210 may also be adapted to insert flags (or markers) into the content in order to identify the location where replacement content is to be inserted.

The mapped content then is routed to PSI/PMT insertion logic 220 that inserts Program Specific Information (PSI) and Program Map Tables (PMT) into the content for use by the decoding side in decoding the programming. If the content is to be encrypted, it may optionally pass through encryption logic 225 prior to modulation at a modulator (e.g., a QAM modulator) 230. The modulated stream of content is then transmitted via transmission medium 130 to digital device 110 and perhaps other digital devices. For instance, the modulated stream of content may be routed to via a cable plant 235 to digital device 110 residing with the end users. The operation performed by content provider 120, including but not limited to the PID mapping for content replacement, is carried out under control of a control computer 240.

In general, a system can be used to form a content substitution encoder consistent with certain embodiments of the invention in which input data inclusive of main content and replacement content. PID mapping logic 210 assigns a primary PID to the main content (e.g., such as a main or primary advertisement) and assigns a secondary PID to the replacement content (e.g. such as replacement advertisements). Private data to identify the main content by the primary PID and replacement content by the secondary PID, along with the main content mapped to the primary PID and the replacement content mapped to the secondary PID, are assembled into a data stream.

Figure 3:
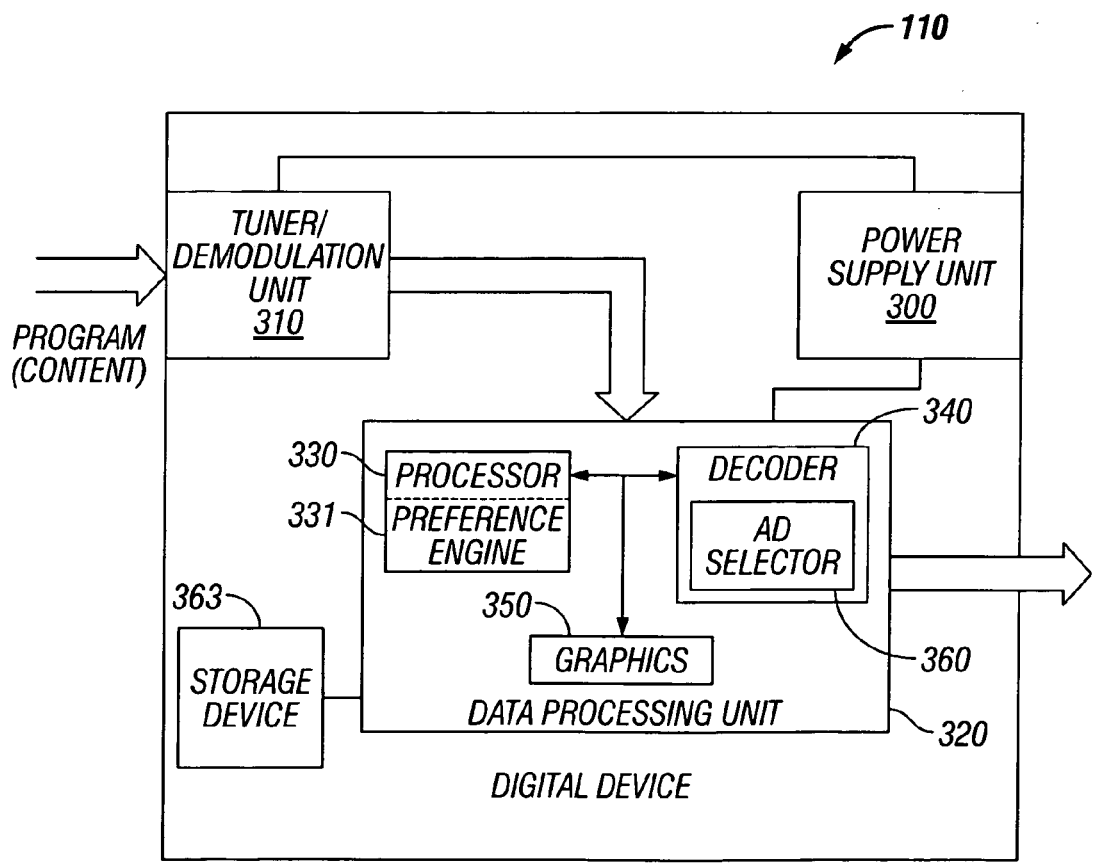
FIG. 3 is an exemplary diagram of a digital device including targeted advertisement selection features of the content delivery system of FIG. 2.

Referring now to FIG. 3, an exemplary diagram of digital device 110 of the content delivery system 100 is shown. Digital device 110 comprises a power supply unit 300, a network interface, such as a tuner/demodulation unit 310 and data processing unit 320. Power supply unit 300 is adapted to provide power to tuner/demodulation unit 310 and data processing unit 320. Power supply unit 300 may provide regulated power based on input power received from a wall socket (e.g., 110 volts alternating current "VAC", 220 VAC, etc.). Tuner/demodulation unit 310 tunes to a channel to receive the program and demodulates an incoming program to recover the content. Then, the content is routed as a digital bit stream to data processing unit 320.

Data processing unit 320 comprises a processor 330 (e.g., central processing unit), a decoder 340 and a graphics component 350. These components may be implemented as separate integrated circuits or as a single integrated circuit (system-on-chip implementation) as shown.

According to one embodiment of the invention, decoder 340 is implemented with an Ad selector 360 that is adapted to alternatively select replacement Ads during playback of video and/or audio. In general, according to one embodiment of the invention, Ad selector 360 is designed to select alternate PID(s) from the digital bit stream based on findings by processor 330, which accesses meta data in Adaptation fields within MPEG packets to obtain information for use in evaluating whether to replace a main or primary Ad associated with the program with a secondary targeted replacement Ad, as will be described.

As previously discussed, content may be delivered in a stream of packets and substituting the primary advertisement with the replacement advertisement may include swapping packets. In one example, the packets may be in a MPEG transport stream of packets and may include Internet Protocol (IP) packets. Thus, the content may be delivered in a stream of IP packets. In this embodiment, substituting the primary advertisement with the replacement advertisement includes selecting fields within the IP packets.

Further, in conjunction with the Ad selector 360 of decoder 340, processor 330 may implement a preference engine that may be utilized in replacing the primary Ad associated with the program with a secondary targeted replacement Ad.

More particularly, the substitution of the primary Ad with the replacement Ad may be conditioned upon the replacement Ad being determined to be a more appropriate Ad for the user, which may be based upon user preferences that are determined, for example, by the preference engine 331 of the processor 330. For example, the preference engine 331 may create and update advertisement preference parameters associated with a user of the digital device 110.

As will be described, in determining whether a replacement Ad is more appropriate than a primary Ad, Ad selector 360 may compare advertisement descriptor parameters associated with the primary advertisement and the replacement advertisements with the advertisement preference parameters generated by preference engine 331 that are associated with a user of the digital device 110 in order to determine whether the primary Ad or one of the replacement Ads is the most appropriate Ad to be rendered to the user. It should be appreciated that the functionality related to the determination of whether to select a primary Ad or replacement Ad using an Ad selector may be implemented by the processor, decoder, or combinations thereof.

As an example, preference engine 331 implemented by processor 330 may be configured to track user selection of content viewed by the user, as well as, advertisements watched in full, versus advertisements that are skipped over.

This sort of information may be used in determining advertisement preference parameters. For example, as to previously viewed video content and advertisements watched, preference parameters associated with sports, interests (e.g. housing, news, gardening, cars, etc.), language, age, sex, and location may be determined. Additionally, the preference engine may utilize already known (e.g. via registration with a cable provider) or inputted data about the user such as the user's location, sex, age, etc.

Thus, in one embodiment, the preference engine 331 may be a software or firmware module that may learn a user's viewing preferences by monitoring the user's viewing patters of video content and/or advertisements. Also, as previously discussed, the user preferences may be inputted directly by the user. The preference engine may store viewing patterns and preference parameters (e.g. advertisement preference parameters) in a local memory of the digital device 110.

Additionally, the digital device may include a storage device 363, such as a hard disk drive or other type of recordable medium, that may store digital content including advertisements.

Graphics component 350 is adapted for rendering on-screen menus or guide data. For instance, processor 330 may be adapted to collect guide data and for storage of such guide data in local memory (not shown). When such data is requested, it is displayed by graphics component 350, which would overlay video concurrently displayed. Also, graphics component 350 may be adapted to distort or blank out displayed images. Also, in some embodiments, graphic component 350 maybe used to render replacement Ads.

Figure 4A:
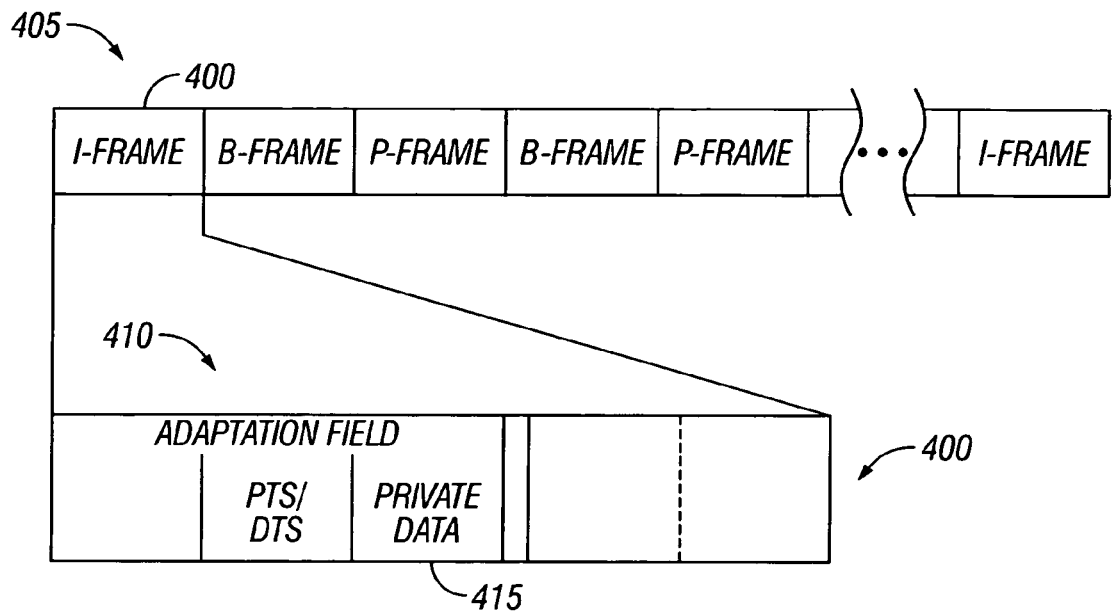
FIGS. 4A and 4B are exemplary diagrams of an Adaptation field of an I-frame, being a portion of a MPEG packet of a digital broadcast data stream.
Figure 4B:
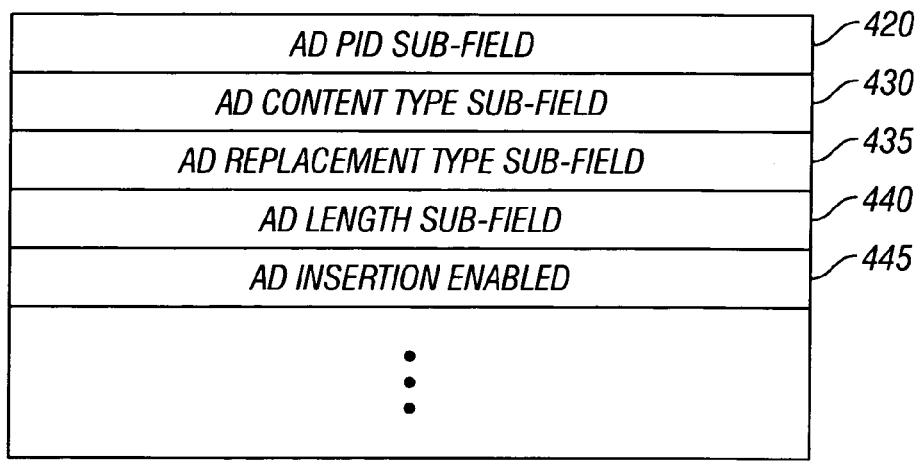

Referring to FIGS. 4A and 4B, exemplary diagrams of an Adaptation field 410 of an I-frame 400, being a portion of a MPEG packet 405 of the digital data stream (e.g., an IP data stream including IP packets) is shown. Adaptation field 410 features control information 415 (also referred to as "private data") to initiate Ad replacement operations as will be described.

According to one embodiment of the invention, the Adaptation field 410 includes control information 415 used by processor 330 and/or decoder 340 of FIG. 3 to (i) determine if Ad replacement is enabled or disabled and (ii) evaluate whether Ad replacement should be used. This private data 415 may include primary ads as well as secondary replacement ads. Such evaluation is conducted ahead of any scheduled rendering (playback for visual or audible perception) of scenes of digital content.

The Adaptation field 410 includes Ad control parameter 415 that include a plurality of sub-fields, including but not limited or restricted to one or more of the following: (1) Ad PID sub-field 420, (2) Ad Content type sub-field 430; (3) Ad Replacement type sub-field 435; (4) Ad Length sub-field 440; and (5) Ad insertion enabled field 445.

As illustrated in FIG. 4B, the Ad PID sub-field 420 is adapted to identify what PIDs are provided for a scene started by I-frame 400. These PIDs may include a single (Primary) Ad PID where no replacement ad is available, and/or one or more secondary Ad PIDs (e.g., PID-2, PID-3, etc.) for replacement Ads.

Ad Content type sub-field 430 identifies the type of Ad content associated with I-frame 400 and the scene associated with I-frame 400. For instance, the Ad content type sub-field 430 may identify the subject matter of the Ad (e.g. sports, car, food, etc.) and includes advertisement descriptor parameters. This information is used to allow the Ad selector 360 of FIG. 3 to select an appropriate Ad for the user.

Ad replacement type sub-field 435 identifies the type of replacement scheme available. For instance, the replacement scheme may involve full scene replacement or inter-scene data replacement (e.g., pixel obfuscation, pixel replacement, audio muting, audio insertion, etc.) to reduce transmission bandwidth requirements.

Ad length sub-field 440 identifies the number of frames (I, B, P) associated with the length of the digital data stream forming the Ad content.

Ad insertion enabled sub-field 445 indicates whether Ad insertion should be enabled or not.

Figure 5:
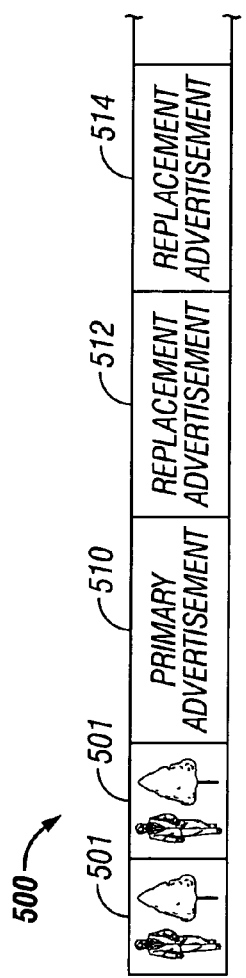
FIG. 5 is an exemplary diagram of an embodiment of a digital data stream including primary and replacement advertisements for use in a targeted advertisement replacement process consistent with certain embodiments of the invention.

Referring now to FIG. 5, FIG. 5 is an exemplary diagram of an embodiment of a digital data stream 500 including a video content program 501, a primary advertisement 510 and multiple replacement advertisements 512, 514, etc. In one embodiment, this sort of digital data stream 500 may be utilized in the targeted advertisement replacement process consistent with certain embodiment of the invention.

Figure 6:
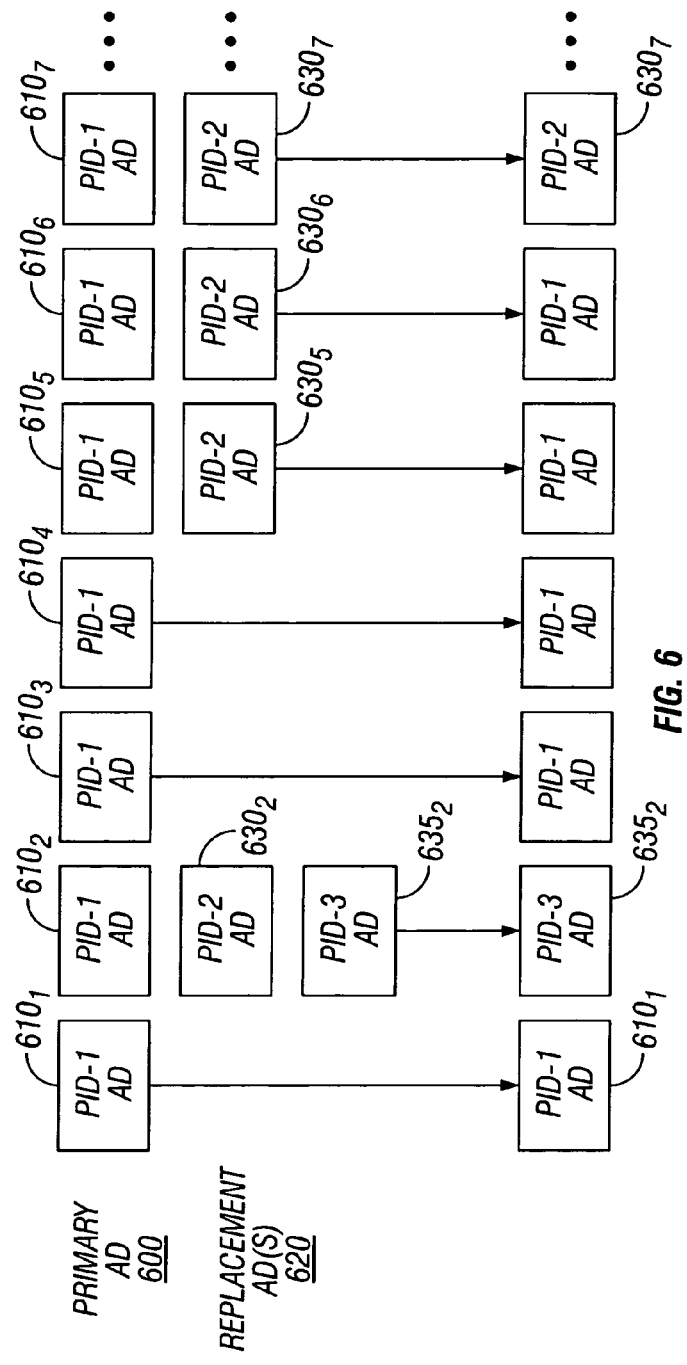
FIG. 6 is an exemplary diagram of an embodiment of a targeted advertisement replacement process consistent with certain embodiments of the invention.

Referring now to FIG. 6, an exemplary diagram of an example of an ad replacement process consistent with certain embodiments of the invention is shown. For this embodiment, Primary Ad 600 may be formed by a plurality of Ad segments $610_1$-$610_N$ (where N>1), which are associated with corresponding primary PIDs (PID-1) and are loaded into Ad selector 360 of FIG. 3.

Replacement Ads 620, namely replacement Ad segments $630_2$, $630_5$-$630_7$ and $635_2$ associated with certain secondary replacement Ad PIDs (PID-2, PID-3), are also provided to the Ad selector.

For example, as shown in FIG. 6, in one instance primary Ad PID-1 may be selected and rendered to the user. This may be because this primary advertisement has been determined to be the most suitable advertisement based upon user preferences or because ad insertion has not been enabled. Alternatively, as an example in which primary ad segments $610_2$ and $610_7$ are determined to be less relevant to a user than replacement ads $635_2$ and $630_7$, these replacement ads are substituted for the primary ads $610_2$ and $610_7$, respectively, and are rendered to the user.

Figure 7:
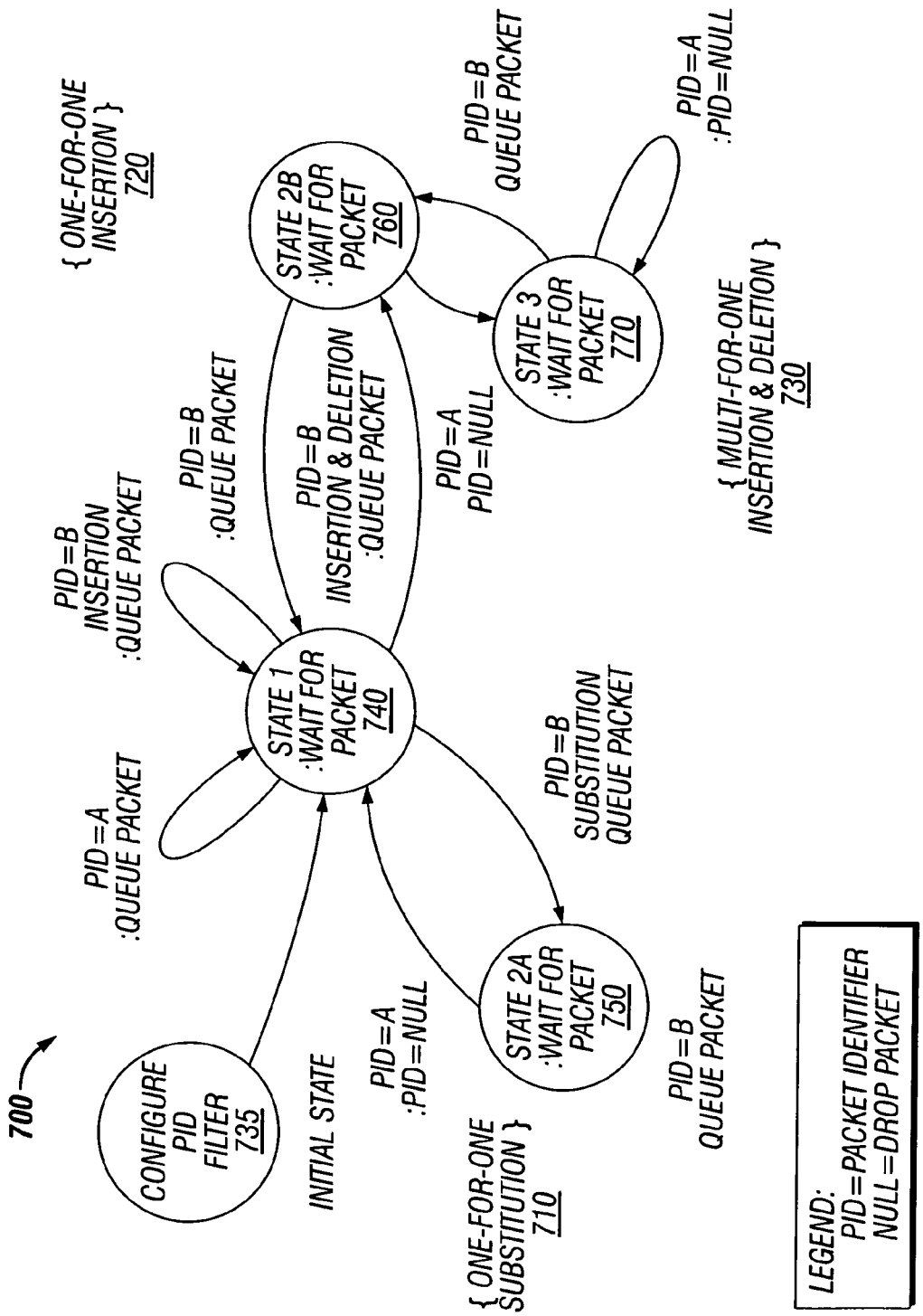
FIG. 7 is an exemplary state diagram of replacement or substitution processing (e.g., packet swapping) based on PIDs.

Referring to FIG. 7, an exemplary state diagram of Ad replacement (e.g., packet swapping) based on multiple, alternate PIDs in order to select the most appropriate Ad is shown. This involves decoding of a transport stream of content with multiple PIDs as illustrated in FIG. 6 for example.

The replacement of main Ad content (primary PID) may include the swapping of a content segment (e.g., packet) of the main Ad with replacement content (secondary PID) and may be referred to as "Substitution Mode" 710. Secondary PID Ads may be inserted into the stream without replacement of the main content. This mode is called "Insertion Mode" 720. In fact, the Ad selector unit 360 of FIG. 3 may be used in a mode where both operations are active at the same time. This is called "Insertion and Deletion Mode" 730. All three modes of operation 710, 720 and 730 are mutually exclusive and follow a series of state transitions that are specific to each mode.

The decoding of the transport stream of content may be conducted by the Ad selector 360 of FIG. 3 in accordance with the operations of the state machine 700. The state machine 700 is configured with four operating states, with Ad selector 360 predominantly remaining in State 1 740 after configuration 735. State 2A 750 and State 2B 760 are entered only when an Ad replacement containing a secondary PID (not the primary PID) has been encountered. Depending upon the mode of operation of the Ad selector unit, as established through messaging in the PSI header from the content provider, different paths to two entirely different second states can be taken.

For instance, a transition from State 1 740 to State 2B 760 can occur due to receipt of a packet marked as "PID B", where the packet marked as "PID B" is inserted into the Transport stream of content as PID A packets. Any packet received while in State 2B with the PID value matching PID A will result in a transition to State 3 770 and their PID value being changed to NULL, effectively removing it from the transport stream. All subsequent content segments received matching PID A while in State 3 will result in their PID value also being changed to NULL.

The state machine 700 can be implemented in either hardware or software, depending upon the IC manufacturer's device architecture. A software implementation on a programmed processor can generally be expected to provide more flexibility in the design.

Figure 8:
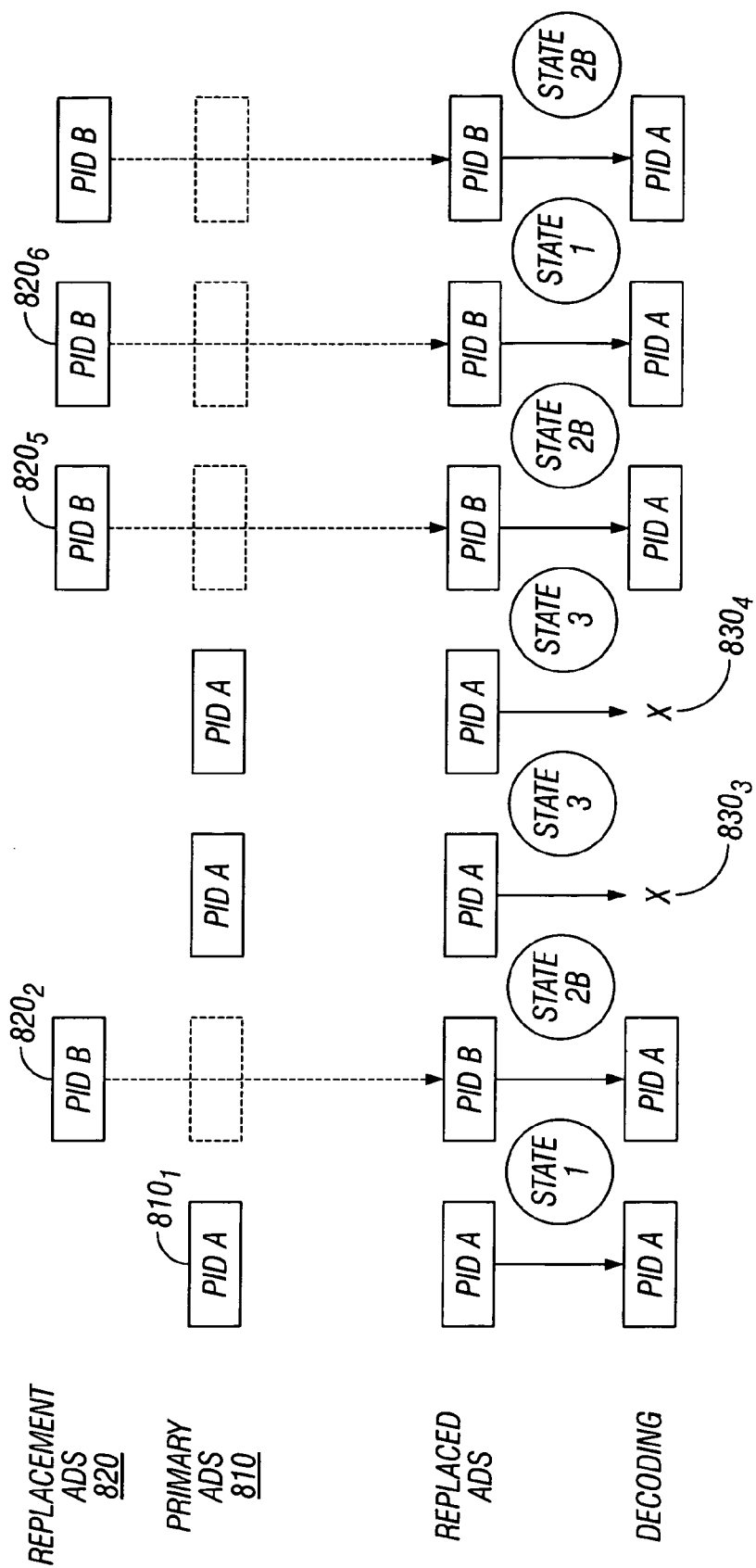
FIG. 8 is an illustrative example of a packet swapping operation for an incoming broadcast data stream for targeted advertisement replacement or substitution in accordance with the state diagram of FIG. 7.

Referring to FIG. 8, an illustrative example of a packet swapping operation for an incoming broadcast data stream in accordance with the state diagram of FIG. 7 is shown. As illustrated, for a first primary Ad $810_1$, the Ad selector 360 of FIG. 3 processes the content segment associated with PID A.

Next, a transition from State 1 740 to State 2B 760 of FIG. 7 occurs after receipt of an insertion flag (not shown), and insertion of PID B into the (content) stream as PID A. Thus, a secondary Ad replacement Ad $820_2$ is processed for display. Any content segment received during this operation state with PID A value without any replacement content will result in a transition to State 3 and their PID value being changed to NULL as shown for decoded content segments $830_3$ and $830_4$, effectively removing them from the content stream.

A transition from State 3 770 to State 2B 760 with replacement Ads $820_5$ being provided and associated with PID B value is shown. PID B is converted to represent PID A within the Transport stream. Likewise, return to State 1 740 from State 2B 760 occurs when content segment $820_6$ with PID B value is received accordingly, it is also queued and converted to the PID A value.

Utilizing the previously-described examples of PID-based packet swapping techniques for replacing advertisements, embodiments of the invention may be implemented in a digital device 110 utilizing an Ad selector 360 in conjunction with a preference engine 331.

More particularly, the digital device 110 may receive an incoming digital data stream that includes a primary advertisement and one or more replacement advertisements, and, if a replacement advertisement is determined to be more appropriate than the primary advertisement, based upon user preferences, then the replacement advertisement may be substituted for the primary advertisement.

As has been previously discussed, content may be delivered in a stream of packets and substituting the primary advertisement with the replacement advertisement may include swapping packets. In one example, the packets may be in a MPEG transport stream of packets and may include Internet Protocol (IP) packets. Thus, the content may be delivered in a stream of IP packets. In this embodiment, substituting the primary advertisement with the replacement advertisement includes selecting fields within the IP packets.

In one embodiment, Ad selector 360, in conjunction with the preference engine 331, may be utilized to determine whether or not one of the replacement advertisements is more appropriate than the primary advertisements. For example, in determining whether a replacement Ad is more appropriate than a primary ad, the Ad selector may compare advertisement descriptor parameters associated with the primary advertisement and the replacement advertisement with advertisement preference parameters associated with the user that are generated from the preference engine. As will be described, advertisement preference parameters may include many different types of parameters such as location, sex, language, sports, interests, prior viewed commercials, user selections, etc.

Figure 9:
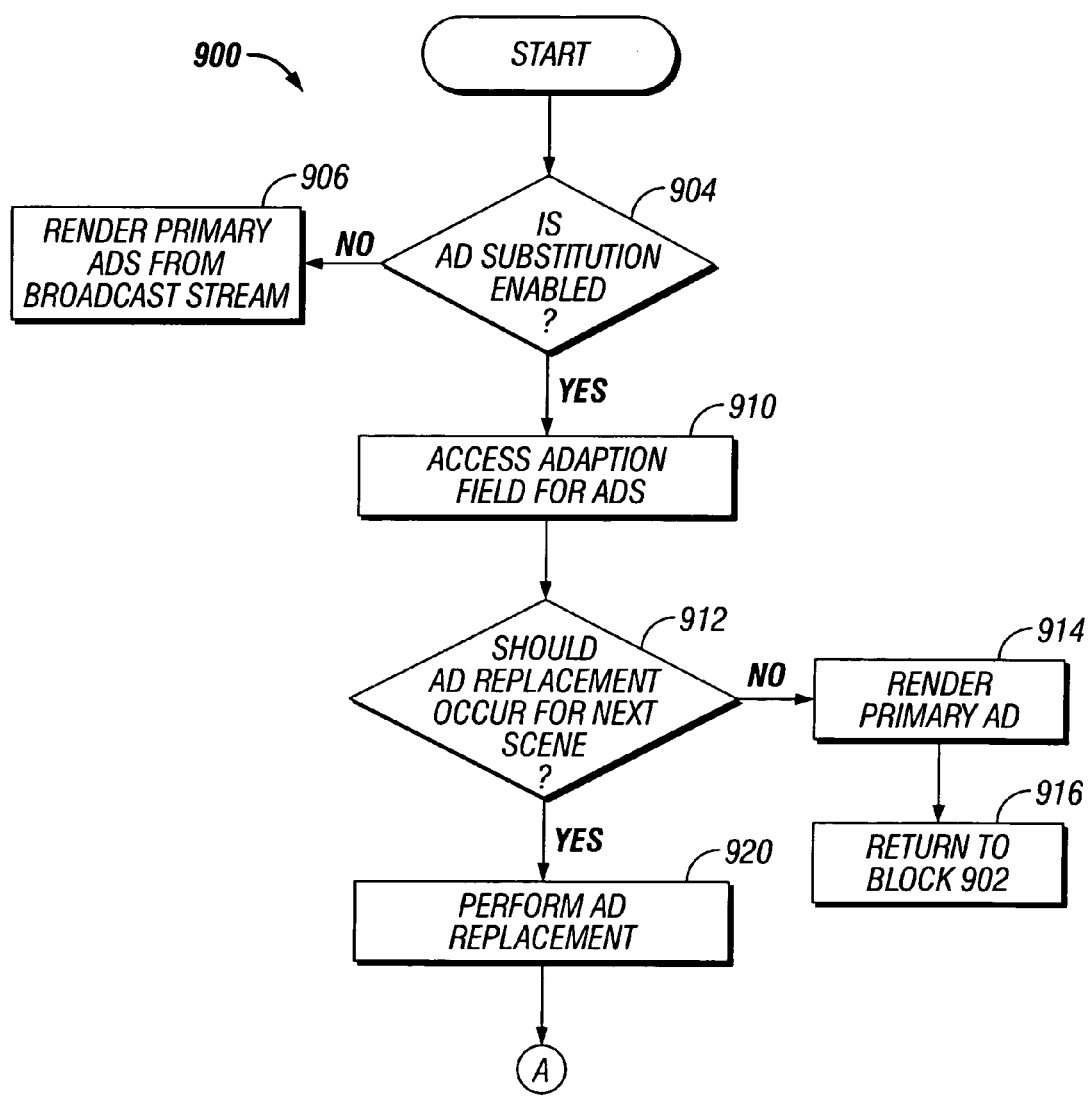
FIG. 9 is an illustrative flowchart of a process for determining whether a targeted advertisement replacement should be performed.

Turning now to FIG. 9, FIG. 9 is an illustrated flow chart of a process for determining whether a targeted advertisement replacement should be performed.

At block 904, it is determined whether or not ad substitution is enabled (for example, this may be accomplished by ad insertion enable flag 445, previously discussed). If ad substitution is not enabled, then the digital device renders the primary ad from the digital broadcast stream (block 906).

On the other hand, if ad substitution is enabled, then the adaption fields 410 are accessed for the primary and replacement ads (block 910). It is next determined whether ad replacement should occur for the next scene (block 912). If not, then the primary ad is rendered (block 914) and process 900 returns back to block 902 (block 916). However, if ad replacement can occur on the next scene, then ad replacement is performed (block 920).

Figure 10:
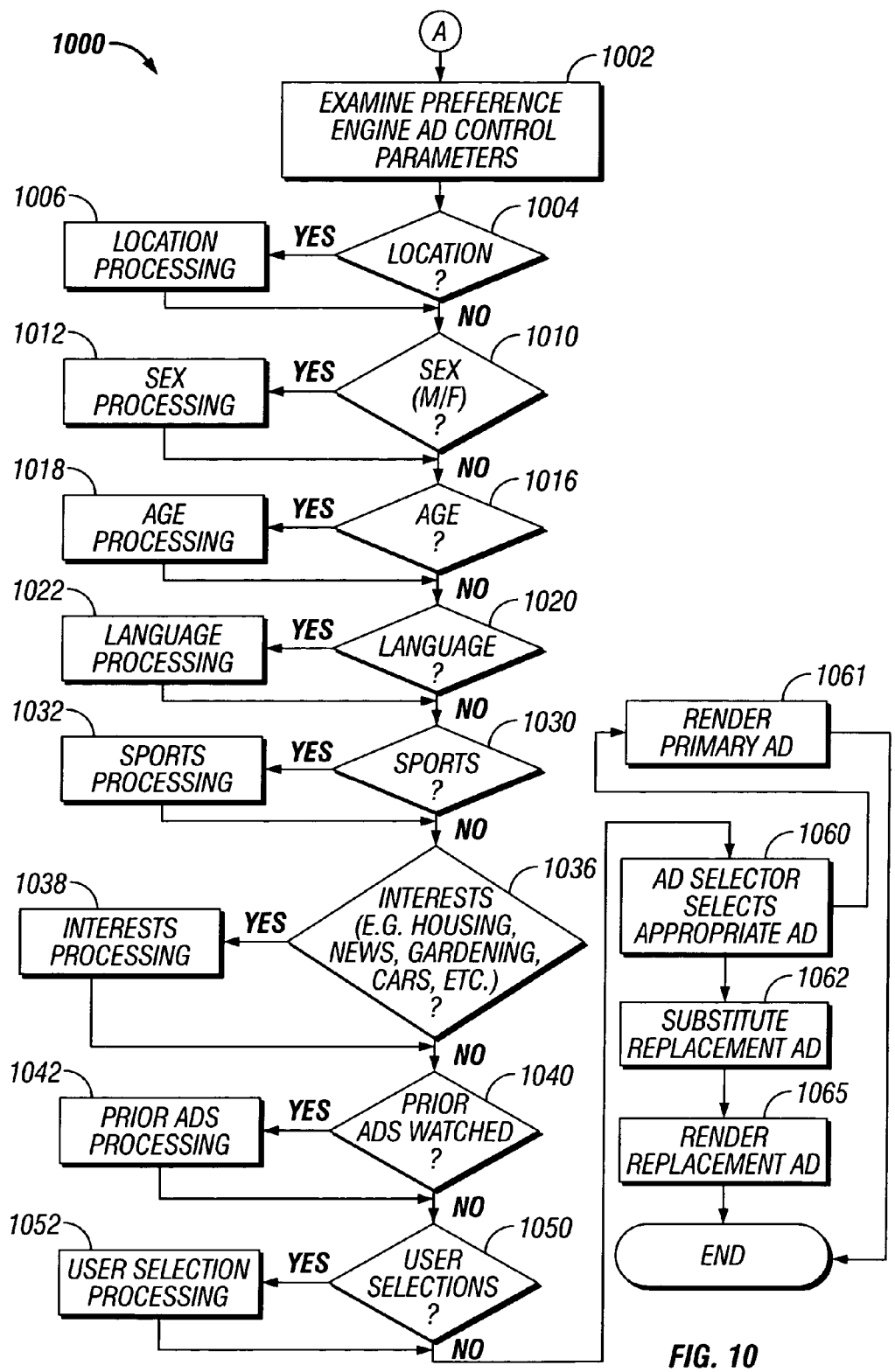
FIG. 10 is an illustrative flowchart of a process for selecting appropriate replacement advertisements based upon preference advertisement parameters for a user.

Moving to FIG. 10, FIG. 10 is a flow chart of a process 1000 for selecting appropriate replacement advertisements based upon user preference advertisement parameters.

At block 1002, preference engine ad control parameters are examined from the preference engine by the ad selector and processor.

For example, it is first determined whether location is a preference engine ad control parameter (block 1004), and if so, location processing is performed (block 1006). At block 1010 it is determined whether sex (m/f) is a preference engine ad control parameter. If so, at block 1012, processing for sex is performed. At block 1016 it is determined whether age is a preference engine ad control parameter. If so, age processing occurs at block 1018. At block 1020 it is determined if language is a preference engine ad control parameter. If so, language processing at block 1022 occurs.

At block 1030 it is determined if sports is a preference engine ad control parameter. If so, sports processing occurs at block 1032. At block 1036 it is determined if interests (e.g. housing, news, gardening, cars, etc.) are preference engine ad control parameters and if so, interests processing is invoked at 1038. At block 1040 it is determined whether prior ads that have been watched are a preference engine ad control parameter. If so, prior ads processing occurs at block 1042.

At block 1050 it is determined if user selection is a preference engine ad control parameter. If so, user selection processing occurs at block 1052. If not, the process moves on to block 1060. User selection parameters may refer to pre-programmed user information about what kind of advertisements the user would like to view.

It should be appreciated that the above-described processing of preference engine Ad control parameters is only an example, and that a wide variety of different types of preference engine ad control parameters may be processed and utilized in the ad selection process.

At block 1060, the Ad selector analyzes advertisement descriptor parameters from the adaption fields of the digital content stream associated with streaming primary advertisements and replacement advertisements and compares them with the preference engine ad control parameters (e.g. location, sex, age, language, sports, interests, prior watched ads, user selections, etc.) and based on this comparison, determines which ad is the most appropriate to be rendered to a user.

If it is the primary Ad, then the primary Ad is rendered (block 1061). If it is one of the replacement Ads, then the most appropriate replacement Ad is substituted for the primary Ad (block 1062) and is rendered to the user (block 1065).

The selection may be based on the user preferences as gathered by the preference engine and based upon the advertisement descriptor parameters associated with the primary and replacement advertisements (that may be set forth in the adaption field). The advertisement descriptor parameters include parameters describing the Ad such that they may be compared against the preference engine Ad control parameters.

It should be appreciated that any number of comparison and selection schemes may be utilized such as averaging the preference Ad control parameter matches, weighting averages of preference Ad control parameter matches as well as other schemes to determine which Ad is most appropriate for a user based on the user's preferences.

Figure 11:
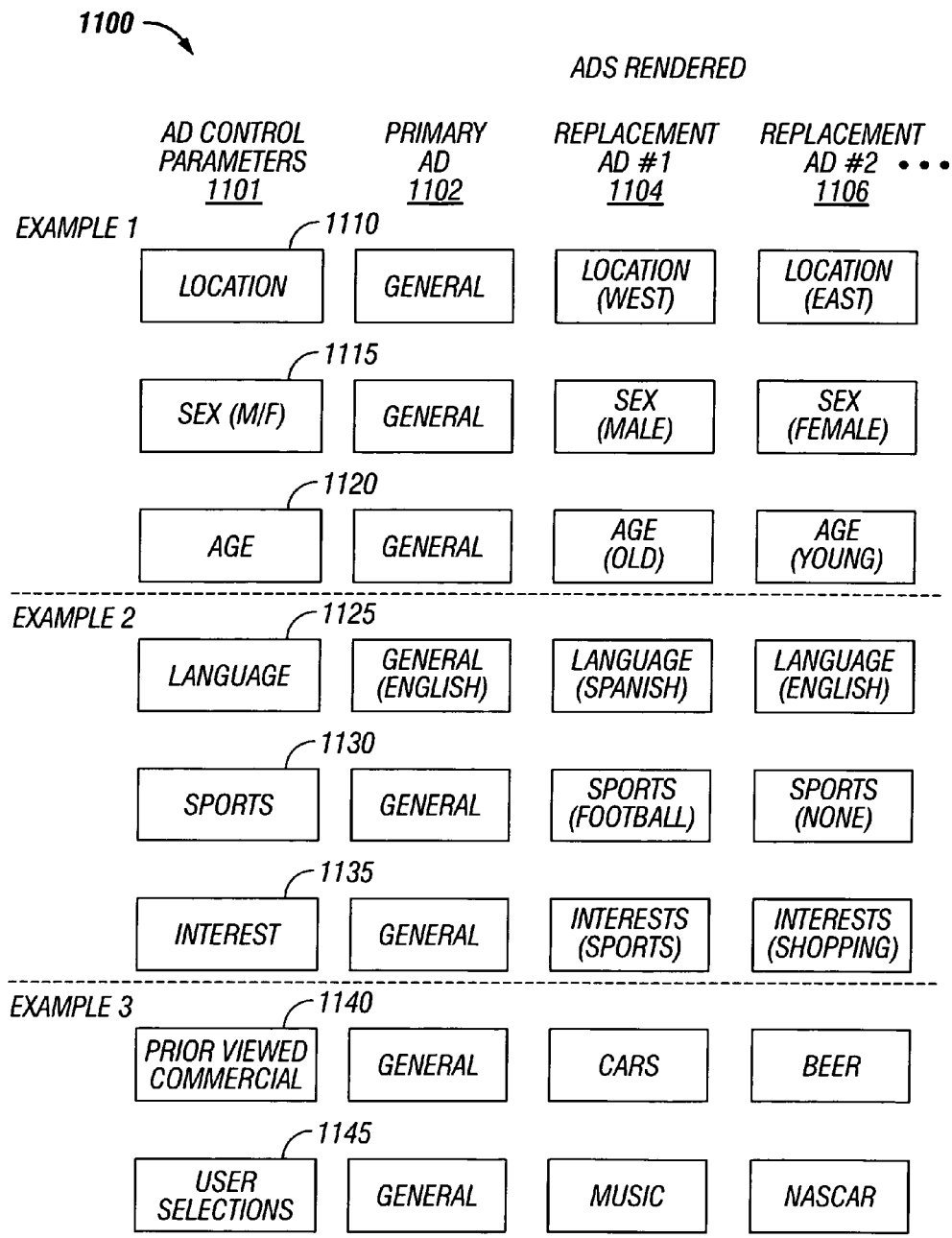
FIG. 11 is a diagram of an example of user preference advertisement control parameters and exemplary types of advertisements.

A very general example will be given with reference to FIG. 11. FIG. 11 is an example of user preference ad control parameters and exemplary ads that may be rendered.

Looking at Example 1, preference engine ad control parameters 1101 are based on location 1110, sex 1115, and age 1120, and in this example, it is assumed that the user is on the east coast, is female, and is young (e.g. under 25). In this example, the Primary Ad 1102 is a beer commercial, Replacement Ad #1 1104 is a NASCAR commercial, and Replacement Ad #2 1106 is a perfume commercial for a store on the east coast. In this instance, the Ad selector would select Replacement Ad #2 1102 due to the close match between the preference engine ad control parameters and the descriptive parameters of Replacement Ad #2 1102.

Looking at Example 2, the preference engine ad control parameters are based on language 1125, previously watched sport shows 1130, and interests 1135 and it is assumed that the user is a Spanish-speaking football fan, and that the Primary Ad 1101 and Replacement Ad #2 are the same as previously-discussed, but that Replacement Ad #1 is a Spanish language commercial for a football stadium. In this instance, the Ad selector would select Replacement Ad #1 1104 due to the close match between the preference engine ad control parameters and the descriptive parameters of Replacement Ad #1 1104.

Lastly, looking at Example 3, if the user preference engine control parameters relate to prior viewed commercials such as theme parks and user selections such as an interest in children's movies and the alternate replacement Ads 1104 and 1106 relate to cars and music and beer and NASCAR, respectively, the ad selector will pick the primary Ad 1102 (e.g. such as a cereal Ad) due to the dissimilarity of the preference engine ad control parameters and the descriptive parameters of the Replacement Ads.

It should be appreciated that the above is just one very simple example of the multitude of different types of examples in which the embodiments of the invention related to substituting primary advertisement with a replacement advertisement based upon the determination that a replacement advertisement may be more appropriate than a primary advertisement based upon user preferences, may be implemented.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are accordingly to be regarded in an illustrative rather than in a restrictive sense.

What is claimed is:

1. A method implemented by a user's digital device for targeting advertisement to a user on a scene-by-scene or sub-scene basis comprising:
   receiving content including a primary advertisement and one or more replacement advertisements at a user's digital device, wherein the primary advertisement and the replacement advertisements are simultaneously delivered in a stream of data packets including packet identifier (PID) values that associate said data packets with the primary advertisement and the replacement advertisements;
   utilizing a preference engine of the user's digital device to determine if one of the replacement advertisements is more appropriate for the user than the primary advertisement based upon a user's advertisement preference parameters by comparing advertisement descriptor parameter data fields associated with the primary advertisement and the replacement advertisements simultaneously delivered in the stream of data packets with the advertisement preference parameters associated with the user stored by the preference engine;
   entering a mode of operation in accordance with a message included in a program specific information (PSI) header received from a content provider, the mode of operation being one of substitution mode, insertion mode, or insertion and deletion mode; and
   utilizing the user's digital device to substitute the primary advertisement with the replacement advertisement if the replacement advertisement is determined to be more appropriate, wherein substituting the primary advertisement with the replacement advertisement includes replacing PID values of the replacement advertisement with PID values of the primary advertisement and changing PID values of the primary advertisement to NULL such that the replacement advertisement is displayed to a user.

2. The method of claim 1 wherein the packets are in a MPEG transport stream of packets and include Internet Protocol (IP) packets.

3. The method of claim 2, wherein the content is delivered in a stream of IP packets and wherein substituting the primary advertisement with the replacement advertisement further includes selecting fields within the IP packets.

4. The method of claim 1, wherein the primary advertisement and the replacement advertisements include a logo.

5. The method of claim 1, wherein the primary advertisement and the replacement advertisements include a banner advertisement.

6. The method of claim 1, wherein the primary advertisement and the replacement advertisements include audio/visual (A/V) commercials.

7. The method of claim 1, further comprising determining whether advertisement substitution functionality is enabled, and, if not, rendering the primary advertisement.

8. The method of claim 1, wherein advertisement preference parameters for a user include at least one of: location, sex, and age.

9. A user's digital device to select advertisements for a user comprising:
   a network interface of the user's digital device adapted to receive incoming content including a primary advertisement and one or more replacement advertisements, wherein the primary advertisement and the replacement advertisements are simultaneously delivered in a stream of data packets including packet identifier (PID) values that associate said data packets with the primary advertisement and the replacement advertisements; and a data processing unit including an advertisement selector and a preference engine of the user's digital device coupled to the network interface, the advertisement selector and the preference engine of the user's digital device to enter a mode of operation in accordance with a message included in a program specific information (PSI) header received from a content provider, the mode of operation being one of substitution mode, insertion mode, or insertion and deletion mode, to determine if one of the replacement advertisements is more appropriate for the user than the primary advertisement based upon a user's advertisement preference parameters by comparing advertisement descriptor parameter data fields associated with the primary advertisement and the replacement advertisements simultaneously delivered in the stream of data packets with the advertisement preference parameters associated with the user stored by the preference engine and to substitute the primary advertisement with the replacement advertisement if the replacement advertisement is determined to be more appropriate, wherein substituting the primary advertisement with the replacement advertisement includes replacing PID values of the replacement advertisement with PID values of the primary advertisement and changing PID values of the primary advertisement to NULL such that the replacement advertisement is displayed to a user.

10. The digital device of claim 9, wherein the primary advertisement and the replacement advertisements include a logo.

11. The digital device of claim 9, wherein the primary advertisement and the replacement advertisements include a banner advertisement.

12. The digital device of claim 9, wherein the primary advertisement and the replacement advertisements include audio/visual (A/V) commercials.

13. The digital device of claim 9, wherein the data processing unit further determines whether advertisement substitution functionality is enabled, and, if not, the data processing unit renders the primary advertisement.

14. The digital device of claim 9, wherein the data processing unit further comprises a preference engine, the preference engine to determine advertisement preference parameters for a user.

15. The digital device of claim 9, wherein advertisement preference parameters for a user include at least one of: location, sex, and age.

16. The digital device of claim 9, wherein the network interface is a tuner/demodulator.

17. The digital device of claim 9, wherein the network interface is a connection to the Internet.

18. A non-transitory machine-readable medium to store instructions, that if executed by logic, will cause a user's digital device to perform the following operations to target advertisements to a user comprising:

receiving content including a primary advertisement and one or more replacement advertisements at a user's digital device, wherein the primary advertisement and the replacement advertisements are simultaneously delivered in a stream of data packets including packet identifier (PID) values that associate said data packets with the primary advertisement and the replacement advertisements;

utilizing a preference engine of the user's digital device to determine if one of the replacement advertisements is more appropriate for the user than the primary advertisement based upon a user's advertisement preference parameters by comparing advertisement descriptor parameter data fields associated with the primary advertisement and the replacement advertisements simultaneously delivered in the stream of data packets with the advertisement preference parameters associated with the user stored by the preference engine;

entering a mode of operation in accordance with a message included in a program specific information (PSI) header received from a content provider, the mode of operation being one of substitution mode, insertion mode, or insertion and deletion mode; and utilizing the user's digital device to substitute the primary advertisement with the replacement advertisement if the replacement advertisement is determined to be more appropriate, wherein substituting the primary advertisement with the replacement advertisement includes replacing PID values of the replacement advertisement with PID values of the primary advertisement and changing PID values of the primary advertisement to NULL such that the replacement advertisement is displayed to a user.

19. The non-transitory machine-readable medium of claim 18, wherein the primary advertisement and the replacement advertisements include a logo.

20. The non-transitory machine-readable medium of claim 18, wherein the primary advertisement and the replacement advertisements include a banner advertisement.

21. The non-transitory machine-readable medium of claim 18, wherein the primary advertisement and the replacement advertisements include audio/visual (A/V) commercials.

22. The non-transitory machine-readable medium of claim 18, further comprising instructions to determine whether advertisement substitution functionality is enabled, and, if not, rendering the primary advertisement.

23. The non-transitory machine-readable medium of claim 18, wherein advertisement preference parameters for a user include at least one of: location, sex, and age.

* * * * *